(12) United States Patent
Beigzadeh et al.

(10) Patent No.: US 7,943,546 B2
(45) Date of Patent: May 17, 2011

(54) POLYMERIZATION MODIFIERS

(75) Inventors: Daryoosh Beigzadeh, Midland, MI (US); Richard E. Campbell, Jr., Midland, MI (US); David D. Devore, Midland, MI (US); Duane R. Romer, Midland, MI (US); James C. Stevens, Richmond, TX (US); Francis J. Timmers, Midland, MI (US); Hendrik E. Tuinstra, Midland, MI (US); Paul C. Vosejpka, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 89 days.

(21) Appl. No.: 12/434,436

(22) Filed: May 1, 2009

(65) Prior Publication Data
US 2009/0264605 A1    Oct. 22, 2009

Related U.S. Application Data

(62) Division of application No. 11/596,336, filed on Nov. 9, 2006, now Pat. No. 7,553,917.

(51) Int. Cl.
*B01J 31/14* (2006.01)
*B01J 31/22* (2006.01)
*C08F 4/64* (2006.01)
*C08F 4/642* (2006.01)

(52) U.S. Cl. ........ 502/132; 502/103; 502/114; 502/167; 526/161; 526/347; 556/176

(58) Field of Classification Search .................. 556/176; 502/103, 114, 167, 132; 526/161, 347
See application file for complete search history.

(56) References Cited

U.S. PATENT DOCUMENTS
4,224,182 A * 9/1980 Langer et al. ............... 502/121
\* cited by examiner

*Primary Examiner* — Caixia Lu

(57) ABSTRACT

A combinatorial method for identifying a catalyst composition for use in the homogeneous addition polymerization of an olefin monomers, said catalyst composition comprising a transition metal compound, a cocatalyst and a polymerization modifier, as well as catalyst compositions and improved olefin polymerization processes resulting therefrom.

7 Claims, 1 Drawing Sheet

POLYMERIZATION MODIFIERS

CROSS REFERENCE STATEMENT

This application claims the benefit of U.S. Provisional Application No. 60/580,330, filed Jun. 16, 2004 and is a divisional application of U.S. Ser. No. 11/596,336, filed Nov. 9, 2006 now U.S. Pat. No. 7,553,917.

BACKGROUND

The present invention relates to the field of research for new catalyst compositions especially for use in polymerization processes. More particularly, this invention is directed toward an apparatus and method of performing homogeneous, and supported homogeneous catalysis employing compositions comprising a transition metal complex, a cocatalyst, and one or more polymerization modifier(s); as well as related techniques for rapidly creating and testing libraries of such compositions. This invention is also directed toward the use of certain catalyst compositions having improved properties in olefin polymerizations.

Combinatorial and other high through-put techniques have been used to rapidly screen large numbers of compounds for use in biological, organic and inorganic synthesis and research. Combinatorial materials science generally refers to the methods for creating a collection of chemically diverse compounds or materials and to methods for rapidly testing or screening this library of compounds or materials for desirable performance characteristics and properties. Areas for application of such combinatorial methods have included the discovery of inorganic compounds for use as high-temperature superconductors, magnetoresistive materials, luminescent compounds, and catalysts. Examples include U.S. Pat. Nos. 5,712,171, 5,776,359, 5,985,356, 6,004,617, 6,030,917, 6,045,671, 6,248,540, 6,326,090, 6,346,290, and 6,627,571, EP-A-978,499, and WO 00/40331.

In addition to the foregoing patent references, numerous academic papers have also disclosed combinatorial techniques, including: Senkan, *Nature*, vol. 394, pp. 350-353 (Jul. 23, 1998); Burgess et al., *Angew. Chem. Int. Ed. Eng.*, 1996, 35, No. 2, pp. 220-222; Maier et al., *Angew. Chem. Int. Ed. Eng.*, 1998, 37, No. 19, pp. 2644-2647; Reetz et al., *Angew. Chem. Int. Ed. Eng.*, 1998, 37, No. 19, pp. 2647-2650; *Angew. Chem. Int. Ed. Eng.*, 1998, 37, No. 17, pp. 2333-2336; Morken et al., *Science*, vol. 280, pp. 267-270 (Apr. 10, 1998); Gilbertson et al., *Tetrahedron Letters*, vol. 37, no. 36, pp. 6475-6478 (1996), and Boussie, et al., *JACS,* 2003, 125, 4306-4317.

In WO 00/40331 a combinatorial apparatus and method for evaluating homogeneous and supported homogeneous coordination polymerization catalysts including olefin polymerization catalysts employing a metal compound formed from a metal of Groups 3-15 of the Periodic Table of the Elements and one or more ligands is disclosed.

Although the foregoing and other references have advanced the art of combinatorial materials testing, still further improvements and advances are desired. In particular, more rapid techniques of screening candidate materials are desired. Moreover, while combinatorial techniques have been applied to the discovery of simple metal complex/cocatalyst combinations, more complex compositions including a polymerization modifier have not previously been treated to combinatorial techniques. More specifically, there remains a need to apply combinatorial techniques to rapidly screen and evaluate catalyst compositions comprising a polymerization modifier. Accordingly, there remains a need for a combinatorial method and apparatus for the rapid and reliable discovery and development of polymerization modifier containing compositions that is particularly adapted to use in olefin polymerizations.

Various transition metal complexes and catalyst compositions containing the same are previously known in the art. These complexes and methods for their preparation are described, inter alia, in U.S. Pat. Nos. 5,703,187, 6,013,819, 5,189,192, 5,532,394, 5,470,993, 5,486,632, 5,770,538, 5,495,036, 6,015,868, 6,153,776, 6,107,421, 5,866,704, 6,268,444, 6,034,022, 6,150,297, 6,515,155, 6,613,921, 5,972,822, 5,854,362, 5,892,076, 5,817,849, 6,084,115, 6,103,657, and 6,284,905 in publications 2003US 0204017, 2002US 0142912, WO 2000 020377, WO 2000/40331, and WO 2002 038628, and elsewhere.

Various cocatalysts, activators and activating techniques are similarly known in the art for use in combination with the foregoing metal complexes. Examples of references wherein cocatalysts are disclosed include the foregoing list of patents and publications as well as U.S. Pat. Nos. 5,064,802, 5,321, 106, 5,721,185, 5,372,682, 5,783,512, 5,919,983, 6,344,529, 6,395,671, 6,214,760, and elsewhere.

Known compounds that have been previously disclosed for use in combination with transition metal complexes and cocatalysts in olefin polymerizations include alumoxanes, aluminum alkyls, and metal alkoxy or amide compounds, as disclosed in U.S. Pat. Nos. 5,453,410, 5,721,183, 6,074,977, 6,017,842, 6,214,760, 6,387,838, and elsewhere.

SUMMARY OF THE INVENTION

This invention provides methods and apparatus for performing the combinatorial synthesis of libraries and screening of those combinatorial libraries particularly adapted for use in homogeneous or supported homogeneous addition polymerizations employing catalyst compositions comprising a polymerization modifier.

The broadest concept of the methodology is that a library of catalyst compositions is created and screened for olefin polymerization activity, especially by measurement of process variables under polymerization conditions or properties of the resulting polymer product. The libraries that are created are typically formed from arrays of organometallic compounds or mixtures or multi-level arrays thereof by one or more conversion steps to form catalyst compositions. The catalyst compositions comprise at a minimum a transition metal compound or complex, a cocatalyst able to convert the catalyst into an active olefin polymerization composition, and a polymerization modifier. The resulting products are screened for polymerization activity under addition polymerization conditions and/or properties of the resulting polymer. This invention provides a number of embodiments for performing such synthesis and screening, and the embodiments may be combined together.

In the library, each member may have a common property or functionality, but will vary in structural diversity, molecular weight or some other variable to be tested (rational variation). Alternatively, the library may contain a mixture of diverse compounds with no unifying feature or structure (random variation). The individual members of the library differ from each other in some chemically significant manner, however, for purposes of calibration and statistical analysis, some repetition of library members may be desired. Optionally, one or more daughter libraries may be created from the parent library by taking one or more aliquots from one or more members of the parent library and combining them, optionally with any additional components. For example, each daughter library may be considered to be a replica of the original library, but include one or more additional components or chemical operations. At least one transition metal complex should be present in at least a portion of the members of the precursor library or a daughter library to create one or more catalyst libraries, which are then subjected to addition polymerization conditions. The polymerization may be used to create a product library, that is, a polymer library. Alternatively, the polymerization may serve as a screen for activity. The process conditions may also be combinatorialized, such as by varying amounts of reactants or different polymerization conditions such as time, temperature, pressure, stirring rate, order of reagent addition, impurity type and amount, and so forth. The method optionally may provide different screening stages, such as a primary screen to eliminate some members from a library from going on to a secondary screen. One or more members of the library or the precursors thereto may be substituted with a known standard, a blank, or an inert compound to further identify desired properties.

One embodiment of the present invention particularly adapted for researching for novel catalyst compositions according to the invention starts with a transition metal complex library that includes a plurality of member compounds, comprising at least one transition metal complex or precursor thereto. The complexes generally will differ by composition, by structure, or by both composition and structure. Examples include complexes such as hydrocarbyl, chloride or amide derivatives of a metals of Groups 3-11 of the Periodic Table of the Elements, containing at least one π-bonded ligand group or at least one electron donative ligand group, as well as Lewis base containing derivatives of such compounds, or mixtures of the foregoing compounds. If desired, the library may also begin with precursors to the foregoing transition metal complexes and/or ligands thereof and incorporate an additional level of synthesis in preparing a daughter library comprising the desired transition metal complexes.

The library (transition metal complex library, cocatalyst library or polymerization modifier library) may be subjected to one or more conversion processes that may involve one or more steps or repetitions of steps involving one or more reagents or treatments in order to form a catalyst composition to be screened. Examples of such conversion processes include metallation, metathesis or other chemical conversion of the transition metal complex or precursor, addition of one or more solvents, mixing, heating, cooling, filtering, extracting, or simply aging, and finally combination with a cocatalyst and one or more polymerization modifiers. Separate libraries of such cocatalysts and polymerization modifiers or the components used to prepare the same, may also be employed in combination with the library of transition metal complexes (or precursors thereof) in order to evaluate and screen various combinations of transition metal complex, cocatalyst and polymerization modifier, and processes for forming such cocatalyst or polymerization modifier.

The foregoing manipulations require the use of a cell or other suitable reaction vessel capable of allowing measured addition of reagents, adequate mixing and manipulation of the resulting reaction mixtures, heating and or cooling of the reactor contents, separations of products, and removal of by-products, solvents, or other constituents. Desirably, each reaction cell or vessel is sealed and subjected to an inert atmosphere or otherwise isolated from the atmosphere, other reaction cells, and from the library or libraries in order to prevent loss of volatile reactor components or contamination of other reagents, reactors, or reactions. In one embodiment, each reactor or cell is equipped with or has access to a filtration means that allows for ready separation of liquids from solid reactor contents in the cell. The filtration device may be externally mounted and inserted into the cell for purposes of performing the foregoing separation and thereafter removed or disengaged from the cell upon completion of the separation. Alternatively, each cell may include a filter medium, such as a fritted glass surface in contact with the reactor contents and a valve or other selector means, for separation/removal of liquid components. If desired, the apparatus may additionally include separate reaction vessels for pretreatment or formation of the various components, especially the polymerization modifier, prior to charging to the reaction cell.

In another embodiment, mixtures of starting components (such as ligands, organometal compounds, metallated derivatives, cocatalysts, polymerization modifiers, additives, monomers, solvents, impurities, and so forth) are combined in different ratios, orders, or methods. The polymerization is performed under varying conditions to create a product library or array. In this embodiment the conditions of the polymerization process may be variables that are combinatorialized. Suitable process conditions that may be combinatorialized include amounts and ratios of starting components, repetitions of process steps, purification and recovery of metal complex, polymerization modifier, or catalyst compositions, order of addition of catalyst composition components, time allowed for formation of catalyst composition or any component thereof, catalyst formation reaction temperature and pressure, rate of starting component addition to the reaction, residence time (or product removal rate), polymerization temperature, pressure, reaction atmosphere, mixing rate, and any other conditions that those of skill in the art will recognize.

In addition, the foregoing embodiments can be combined together. For example, this invention may be practiced by having diversity in the starting components used; by having diversity in the reaction conditions used to form the catalyst library (such as time, temperature, mixing speed, or other conditions used in catalyst formation); by diversity in the polymerization conditions used; or by a combination of all the foregoing variables. The library of polymer products is screened by measurement of polymerization conditions such as heat generated, or more preferably, consumption of one or more monomers, or by resulting polymer properties, such as molecular weight or molecular weight distribution. The polymer library may also be tested to determine if a polymer of interest has been created using conventional analysis techniques or by use of one of many different rapid polymer characterization techniques.

Because polymer properties can be adversely affected by post reactor conditions, physical testing of product properties may not be an accurate indicator for screening of candidate materials. Polymer properties are often preserved after formation until physical testing can be conducted through the addition of antioxidants, stabilizers and other preservatives to the polymer sample. Incorporating and adapting the use of such additives to the small sample size typically employed in combinatorial materials testing can be highly impractical and add significantly complexity, delay and cost to the resulting protocol. Moreover, adequate and reproducible incorporation throughout the library can prove difficult and at a minimum introduces another source of variability. Accordingly, a preferred screening method for use in the present invention is the testing and recording of process conditions encountered during polymerization.

The embodiments of this methodology may be combined into a flexible system that includes a number of different stations including one or more stations for combining starting materials, daughtering the libraries, performing the reactions of interest, and screening the results of the process. The system includes a control system that controls, monitors and directs the activities of the system so that a user may design an entire series of experiments by inputting library design, screening, and/or data manipulation criteria.

Those of skill in the art will appreciate the variety of methods for creating diversity in the libraries of this invention. The screens are employed to determine if the diversity has produced a product or process of interest, preferably by directly measuring one or more process parameters, thereby providing a quantifying means for evaluating the individual members of the library. Through careful application of the principles outlined herein, the present inventors have now succeeded in providing a combinatorial research technique that is specifically adapted for the identification of catalyst compositions comprising a transition metal complex, a cocatalyst and a polymerization modifier.

DETAILED DESCRIPTION

Figure 1:
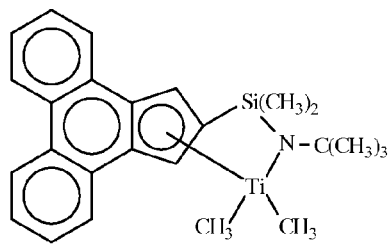
FIGS. 1-5 are the chemical structures of the metal complexes (catalyst precursors) identified as C1, C2, C3, C4 and C5 in Examples 1-4.

All reference to the Periodic Table of the Elements herein shall refer to the Periodic Table of the Elements, published and copyrighted by CRC Press, Inc., 2001. Also, any reference to a Group or Groups shall be to the Group or Groups as reflected in this Periodic Table of the Elements using the IUPAC system for numbering groups. For purposes of United States patent practice, the contents of any patent, patent application, or publication referenced herein are hereby incorporated by reference in their entirety (or the equivalent US version thereof is so incorporated by reference) especially with respect to the disclosure of synthetic techniques, raw materials, and general knowledge in the art. Unless stated to the contrary, implicit from the context, or customary in the art, all parts and percents are based on weight.

If appearing herein, the term "comprising" and derivatives thereof is not intended to exclude the presence of any additional component, step or procedure, whether or not the same is disclosed herein. In order to avoid any doubt, all compositions claimed herein through use of the term "comprising" may include any additional additive, adjuvant, or compound, unless stated to the contrary. In contrast, the term, "consisting essentially of" if appearing herein, excludes from the scope of any succeeding recitation any other component, step or procedure, excepting those that are not essential to operability. The term "consisting of", if used, excludes any component, step or procedure not specifically delineated or listed. The term "or", unless stated otherwise, refers to the listed members individually as well as in any combination.

Highly desirably, the methodology of the present invention involves selection of the desired catalyst composition based on optimization or maximizing at least two and, more preferably, at least 3 process or product variables, measured pursuant to the present screening procedure.

Catalysts

Transition metal compounds for use herein include compounds or complexes of metals selected from Groups 3-11, preferably Groups 4-8 of the Periodic Table of the Elements, most preferably Group 4, that is, titanium, zirconium and hafnium. Preferred compounds are those containing one or more delocalized, π-bonded ligands or polyvalent Lewis base ligands. Examples include metallocene, half-metallocene, constrained geometry, and polyvalent pyridylamine base complexes. The compounds are generically depicted by the formula: $MK_kX_xZ_z$, or a dimer thereof, wherein M is a transition metal selected from Groups 3-10 of the Periodic Table of the Elements, preferably of a metal of Groups 4-8, most preferably a Group 4 metal;

K independently each occurrence is a group containing delocalized π-electrons through which K is bound to M, said K group containing up to 50 atoms not counting hydrogen atoms, optionally two or more K groups may be joined together forming a bridged structure, and further optionally one or more K groups may be bound to Z, to X or to both Z and X;

X independently each occurrence is a monovalent, anionic moiety having up to 40 non-hydrogen atoms, optionally one or more X groups may be bonded together thereby forming a divalent or polyvalent anionic group, and, further optionally, one or more X groups and one or more Z groups may be bonded together thereby forming a moiety that is both covalently bound to M and coordinated thereto;

Z independently each occurrence is a neutral, Lewis base donor ligand of up to 50 non-hydrogen atoms containing at least one unshared electron pair through which Z is coordinated to M;

k is an integer from 0 to 3;

x is an integer from 1 to 4;

z is a number from 0 to 3; and the sum, k+x, is equal to the formal oxidation state of M.

Suitable metal complexes include those containing from 1 to 3 π-bonded anionic or neutral ligand groups, which may be cyclic or non-cyclic delocalized π-bonded anionic ligand groups. Exemplary of such π-bonded groups are conjugated or nonconjugated, cyclic or non-cyclic diene and dienyl groups, allyl groups, boratabenzene groups, phosphole, and arene groups. By the term "π-bonded" is meant that the ligand group is bonded to the transition metal by a sharing of electrons from a partially delocalized π-bond.

Each atom in the delocalized π-bonded group may independently be substituted with a radical selected from the group consisting of hydrogen, halogen, hydrocarbyl, halohydrocarbyl, hydrocarbyl-substituted heteroatoms wherein the heteroatom is selected from Group 14-16 of the Periodic Table of the Elements, and such hydrocarbyl-substituted heteroatom radicals further substituted with a Group 15 or 16 hetero atom containing moiety. In addition two or more such radicals may together form a fused ring system, including partially or fully hydrogenated fused ring systems, or they may form a metallocycle with the metal. Included within the term "hydrocarbyl" are $C_{1-20}$ straight, branched and cyclic alkyl radicals, $C_{6-20}$ aromatic radicals, $C_{7-20}$ alkyl-substituted aromatic radicals, and $C_{7-20}$ aryl-substituted alkyl radicals. Suitable hydrocarbyl-substituted heteroatom radicals include mono-, di- and tri-substituted radicals of boron, silicon, germanium, nitrogen, phosphorus or oxygen wherein each of the hydrocarbyl groups contains from 1 to 20 carbon atoms. Examples include N,N-dimethylamino, pyrrolidinyl, trimethylsilyl, triethylsilyl, t-butyldimethylsilyl, methyldi(t-butyl)silyl, triphenylgermyl, and trimethylgermyl groups. Examples of Group 15 or 16 hetero atom containing moieties include amino, phosphino, alkoxy, or alkylthio moieties or divalent derivatives thereof, for example, amide, phosphide, alkyleneoxy or alkylenethio groups bonded to the transition metal or Lanthanide metal, and bonded to the hydrocarbyl group, π-bonded group, or hydrocarbyl-substituted heteroatom.

Examples of suitable anionic, delocalized π-bonded groups include cyclopentadienyl, indenyl, fluorenyl, tetrahydroindenyl, tetrahydrofluorenyl, octahydrofluorenyl, pentadienyl, cyclohexadienyl, dihydroanthracenyl, hexahydroanthracenyl, decahydroanthracenyl groups, phosphole, and boratabenzyl groups, as well as inertly substituted derivatives thereof, especially $C_{1-10}$ hydrocarbyl-substituted or tris($C_{1-10}$ hydrocarbyl)silyl-substituted derivatives thereof. Preferred anionic delocalized π-bonded groups are cyclopentadienyl, pentamethylcyclopentadienyl, tetramethylcyclopentadienyl, tetramethylsilylcyclopentadienyl, indenyl, 2,3-dimethylindenyl, fluorenyl, 2-methylindenyl, 2-methyl-4-phenylindenyl, tetrahydrofluorenyl, octahydrofluorenyl, 1-indacenyl, 3-pyrrolidinoinden-1-yl, 3,4-(cyclopenta(l)phenanthren-1-yl, and tetrahydroindenyl.

The boratabenzyl ligands are anionic ligands which are boron containing analogues to benzene. They are previously known in the art having been described by G. Herberich, et al., in Organometallics, 14, 1, 471-480 (1995). Preferred boratabenzenes correspond to the formula:

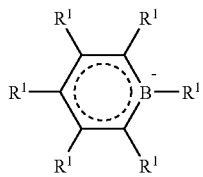

wherein $R^1$ is an inert substituent, preferably selected from the group consisting of hydrogen, hydrocarbyl, silyl, halo or germyl, said $R^1$ having up to 20 atoms not counting hydrogen, and optionally two adjacent $R^1$ groups may be joined together. In complexes involving divalent derivatives of such delocalized π-bonded groups one atom thereof is bonded by means of a covalent bond or a covalently bonded divalent group to another atom of the complex thereby forming a bridged system.

Phospholes are anionic ligands that are phosphorus containing analogues to a cyclopentadienyl group. They are previously known in the art having been described by WO 98/50392, and elsewhere. Preferred phosphole ligands correspond to the formula:

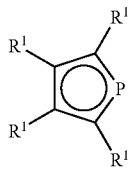

wherein $R^1$ is as previously defined.

Preferred transition metal complexes for use herein correspond to the formula: $MK_kX_xZ_z$, or a dimer thereof, wherein:
M is a Group 4 metal;
K is a group containing delocalized π-electrons through which K is bound to M, said K group containing up to 50 atoms not counting hydrogen atoms, optionally two K groups may be joined together forming a bridged structure, and further optionally one K may be bound to X or Z;
X each occurrence is a monovalent, anionic moiety having up to 40 non-hydrogen atoms, optionally one or more X and one or more K groups are bonded together to form a metallocycle, and further optionally one or more X and one or more Z groups are bonded together thereby forming a moiety that is both covalently bound to M and coordinated thereto;
Z independently each occurrence is a neutral, Lewis base donor ligand of up to 50 non-hydrogen atoms containing at least one unshared electron pair through which Z is coordinated to M;
k is an integer from 0 to 3;
x is an integer from 1 to 4;
z is a number from 0 to 3; and
the sum, k+x, is equal to the formal oxidation state of M.

Preferred complexes include those containing either one or two K groups. The latter complexes include those containing a bridging group linking the two K groups. Preferred bridging groups are those corresponding to the formula $(ER'_2)_e$ wherein E is silicon, germanium, tin, or carbon, R' independently each occurrence is hydrogen or a group selected from silyl, hydrocarbyl, hydrocarbyloxy and combinations thereof, said R' having up to 30 carbon or silicon atoms, and e is 1 to 8. Preferably, R' independently each occurrence is methyl, ethyl, propyl, benzyl, tert-butyl, phenyl, methoxy, ethoxy or phenoxy.

Examples of the complexes containing two K groups are compounds corresponding to the formula:

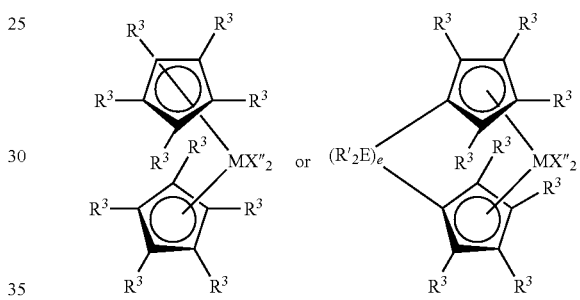

wherein:
M is titanium, zirconium or hafnium, preferably zirconium or hafnium, in the +2 or +4 formal oxidation state;
$R^3$ in each occurrence independently is selected from the group consisting of hydrogen, hydrocarbyl, silyl, germyl, cyano, halo and combinations thereof, said $R^3$ having up to 20 non-hydrogen atoms, or adjacent $R^3$ groups together form a divalent derivative (that is, a hydrocarbadiyl, siladiyl or germadiyl group) thereby forming a fused ring system, and
X" independently each occurrence is an anionic ligand group of up to 40 non-hydrogen atoms, or two X" groups together form a divalent anionic ligand group of up to 40 non-hydrogen atoms or together are a conjugated diene having from 4 to 30 non-hydrogen atoms bound by means of delocalized π-electrons to M, whereupon M is in the +2 formal oxidation state, and
R', E and e are as previously defined.

Exemplary bridged ligands containing two π-bonded groups are:
dimethylbis(cyclopentadienyl)silane, dimethylbis(tetramethylcyclopentadienyl)silane, dimethylbis(2-ethylcyclopentadien-1-yl)silane, dimethylbis(2-t-butylcyclopentadien-1-yl)silane, 2,2-bis(tetramethylcyclopentadienyl)propane, dimethylbis(inden-1-yl)silane, dimethylbis(tetrahydroinden-1-yl)silane, dimethylbis(fluoren-1-yl)silane, dimethylbis(tetrahydrofluoren-1-yl)silane, dimethylbis(2-methyl-4-phenylinden-1-yl)-silane, dimethylbis(2-methylinden-1-yl)silane, dimethyl(cyclopentadienyl)(fluoren-1-yl)silane, dimethyl (cyclopentadienyl)(octahydrofluoren-1-yl)silane, dimethyl (cyclopentadienyl)(tetrahydrofluoren-1-yl)silane, (1,1,2,2- tetramethy)-1,2-bis(cyclopentadienyl)disilane, (1,2-bis (cyclopentadienyl)ethane, and dimethyl(cyclopentadienyl)-1-(fluoren-1-yl)methane.

Preferred X" groups are selected from hydride, hydrocarbyl, silyl, germyl, halohydrocarbyl, halosilyl, silylhydrocarbyl and aminohydrocarbyl groups, or two X" groups together form a divalent derivative of a conjugated diene or else together they form a neutral, π-bonded, conjugated diene. Most preferred X" groups are $C_{1-20}$ hydrocarbyl groups.

Examples of metal complexes of the foregoing formula suitable for use in the present invention include:
bis(cyclopentadienyl)zirconiumdimethyl,
bis(cyclopentadienyl)zirconium dibenzyl,
bis(cyclopentadienyl)zirconium methyl benzyl,
bis(cyclopentadienyl)zirconium methyl phenyl,
bis(cyclopentadienyl)zirconiumdiphenyl,
bis(cyclopentadienyl)titanium-allyl,
bis(cyclopentadienyl)zirconiummethylmethoxide,
bis(cyclopentadienyl)zirconiummethylchloride,
bis(pentamethylcyclopentadienyl)zirconiumdimethyl,
bis(pentamethylcyclopentadienyl)titaniumdimethyl,
bis(indenyl)zirconiumdimethyl,
indenylfluorenylzirconiumdimethyl,
bis(indenyl)zirconiummethyl(2-(dimethylamino)benzyl),
bis(indenyl)zirconiummethyltrimethylsilyl,
bis(tetrahydroindenyl)zirconiummethyltrimethylsilyl,
bis(pentamethylcyclopentadienyl)zirconiummethylbenzyl,
bis(pentamethylcyclopentadienyl)zirconiumdibenzyl,
bis(pentamethylcyclopentadienyl)zirconiummethylmethoxide,
bis(pentamethylcyclopentadienyl)zirconiummethylchloride,
bis(methylethylcyclopentadienyl)zirconiumdimethyl,
bis(butylcyclopentadienyl)zirconiumdibenzyl,
bis(t-butylcyclopentadienyl)zirconiumdimethyl,
bis(ethyltetramethylcyclopentadienyl)zirconiumdimethyl,
bis(methylpropylcyclopentadienyl)zirconiumdibenzyl,
bis(trimethylsilylcyclopentadienyl)zirconiumdibenzyl,
dimethylsilylbis(cyclopentadienyl)zirconiumdimethyl,
dimethylsilylbis(tetramethylcyclopentadienyl)titanium (III) allyl
dimethylsilylbis(t-butylcyclopentadienyl)zirconiumdichloride,
dimethylsilylbis(n-butylcyclopentadienyl)zirconiumdichloride,
(methylenebis(tetramethylcyclopentadienyl)titanium(III) 2-(dimethylamino)benzyl,
(methylenebis(n-butylcyclopentadienyl)titanium(III) 2-(dimethylamino)benzyl,
dimethylsilylbis(indenyl)zirconiumbenzylchloride,
dimethylsilylbis(2-methylindenyl)zirconiumdimethyl,
dimethylsilylbis(2-methyl-4-phenylindenyl)zirconiumdimethyl,
dimethylsilylbis(2-methylindenyl)zirconium-1,4-diphenyl-1,3-butadiene,
dimethylsilylbis(2-methyl-4-phenylindenyl)zirconium (II) 1,4-diphenyl-1,3-butadiene,
dimethylsilylbis(tetrahydroindenyl)zirconium(II) 1,4-diphenyl-1,3-butadiene,
dimethylsilylbis(tetramethylcyclopentadienyl)zirconium dimethyl
dimethylsilylbis(fluorenyl)zirconiumdimethyl,
dimethylsilyl-bis(tetrahydrofluorenyl)zirconium bis(trimethylsilyl),
(isopropylidene)(cyclopentadienyl)(fluorenyl)zirconiumdibenzyl, and
dimethylsilyl(tetramethylcyclopentadienyl)(fluorenyl)zirconium dimethyl.

A further class of metal complexes utilized in the present invention corresponds to the preceding formula: $MKZ_zX_x$, or a dimer thereof, wherein M, K, X, x and z are as previously defined, and Z is a substituent of up to 50 non-hydrogen atoms that together with K forms a metallocycle with M.

Preferred Z substituents include groups containing up to 30 non-hydrogen atoms comprising at least one atom that is oxygen, sulfur, boron or a member of Group 14 of the Periodic Table of the Elements directly attached to K, and a different atom, selected from the group consisting of nitrogen, phosphorus, oxygen or sulfur that is covalently bonded to M.

More specifically this class of Group 4 metal complexes used according to the present invention includes "constrained geometry catalysts" corresponding to the formula:

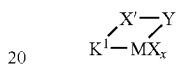

wherein:
M is titanium or zirconium, preferably titanium in the +2, +3, or +4 formal oxidation state;
$K^1$ is a delocalized, π-bonded ligand group optionally substituted with from 1 to 5 $R^2$ groups,
$R^2$ in each occurrence independently is selected from the group consisting of hydrogen, hydrocarbyl, silyl, germyl, cyano, halo and combinations thereof, said $R^2$ having up to 20 non-hydrogen atoms, or adjacent $R^2$ groups together form a divalent derivative (that is, a hydrocarbadiyl, siladiyl or germadiyl group) thereby forming a fused ring system,
each X is a halo, hydrocarbyl, hydrocarbyloxy or silyl group, said group having up to 20 non-hydrogen atoms, or two X groups together form a neutral $C_{5-30}$ conjugated diene or a divalent derivative thereof;
Y is —O—, —S—, —NR'—, —PR'—; and
X' is $SiR'_2$, $CR'_2$, $SiR'_2SiR'_2$, $CR'_2CR'_2$, CR'=CR', $CR'_2SiR'_2$, or $GeR'_2$, and
R' independently each occurrence is hydrogen or a group selected from silyl, hydrocarbyl, hydrocarbyloxy and combinations thereof, said R' having up to 30 carbon or silicon atoms.

Specific examples of the foregoing constrained geometry metal complexes include compounds corresponding to the formula:

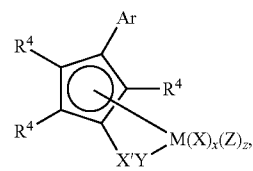

wherein,
Ar is an aryl group of from 6 to 30 atoms not counting hydrogen;
$R^4$ independently each occurrence is hydrogen, Ar, or a group other than Ar selected from hydrocarbyl, trihydrocarbylsilyl, trihydrocarbylgermyl, halide, hydrocarbyloxy, trihydrocarbylsiloxy, bis(trihydrocarbylsilyl)amino, di(hydrocarbyl)amino, hydrocarbadiylamino, hydrocarbylimino, di(hydrocarbyl)phosphino, hydrocarbadiylphosphino, hydrocarbylsulfido, halo-substituted hydrocarbyl, hydrocarbyloxy-substituted hydrocarbyl, trihydrocarbylsilyl-substituted hydrocarbyl, trihydrocarbylsiloxy-substituted hydrocarbyl, bis(trihydrocarbylsilyl)amino-substituted hydrocarbyl, di(hydrocarbyl)amino-substituted hydrocarbyl, hydrocarbyleneamino-substituted hydrocarbyl, di(hydrocarbyl)phosphino-substituted hydrocarbyl, hydrocarbylenephosphino-substituted hydrocarbyl, or hydrocarbylsulfido-substituted hydrocarbyl, said R group having up to 40 atoms not counting hydrogen atoms;

M is titanium;

X' is $SiR^6_2$, $CR^6_2$, $SiR^6_2SiR^6_2$, $CR^6_2CR^6_2$, $CR^6=CR^6$, $CR^6_2SiR^6_2$, $BR^6$, $BR^6L''$, or $GeR^6_2$;

Y is —O—, —S—, —$NR^5$—, —$PR^5$—; —$NR^5_2$, or —$PR^5_2$;

$R^5$, independently each occurrence, is hydrocarbyl, trihydrocarbylsilyl, or trihydrocarbylsilylhydrocarbyl, said $R^5$ having up to 20 atoms other than hydrogen, and optionally two $R^5$ groups or $R^5$ together with Y or Z form a ring system;

$R^6$, independently each occurrence, is hydrogen, or a member selected from hydrocarbyl, hydrocarbyloxy, silyl, halogenated alkyl, halogenated aryl, —$NR^5_2$, and combinations thereof, said $R^6$ having up to 20 non-hydrogen atoms, and optionally, two $R^6$ groups or $R^6$ together with Z forms a ring system;

Z is a neutral diene or a monodentate or polydentate Lewis base optionally bonded to $R^5$, $R^6$, or X;

X is hydrogen, a monovalent anionic ligand group having up to 60 atoms not counting hydrogen, or two X groups are a divalent ligand group;

x is 1 or 2; and z is 0, 1 or 2.

Preferred examples of the foregoing metal complexes are substituted at both the 3- and 4-positions of a cyclopentadienyl or indenyl group with an Ar group.

Examples of the foregoing metal complexes include:
(3-phenylcyclopentadien-1-yl)dimethyl(t-butylamido)silanetitanium dichloride,
(3-phenylcyclopentadien-1-yl)dimethyl(t-butylamido)silanetitanium dimethyl,
(3-phenylcyclopentadien-1-yl)dimethyl(t-butylamido)silanetitanium (II) 1,3-diphenyl-1,3-butadiene;
(3-(pyrrol-1-yl)cyclopentadien-1-yl)dimethyl(t-butylamido)silanetitanium dichloride,
(3-(pyrrol-1-yl)cyclopentadien-1-yl)dimethyl(t-butylamido)silanetitanium dimethyl,
(3-(pyrrol-1-yl)cyclopentadien-1-yl))dimethyl(t-butylamido)silanetitanium (II) 1,4-diphenyl-1,3-butadiene;
(3-(1-methylpyrrol-3-yl)cyclopentadien-1-yl)dimethyl(t-butylamido)silanetitanium dichloride,
(3-(1-methylpyrrol-3-yl)cyclopentadien-1-yl)dimethyl(t-butylamido)silanetitanium dimethyl,
(3-(1-methylpyrrol-3-yl)cyclopentadien-1-yl)dimethyl(t-butylamido)silanetitanium (II) 1,4-diphenyl-1,3-butadiene;
(3,4-diphenylcyclopentadien-1-yl)dimethyl(t-butylamido)silanetitanium dichloride,
(3,4-diphenylcyclopentadien-1-yl)dimethyl(t-butylamido)silanetitanium dimethyl,
(3,4-diphenylcyclopentadien-1-yl)dimethyl(t-butylamido)silanetitanium (II) 1,3-pentadiene;
(3-(3-N,N-dimethylamino)phenyl)cyclopentadien-1-yl)dimethyl(t-butylamido)silanetitanium dichloride,
(3-(3-N,N-dimethylamino)phenylcyclopentadien-1-yl)dimethyl(t-butylamido)silanetitanium dimethyl,
(3-(3-N,N-dimethylamino)phenylcyclopentadien-1-yl)dimethyl(t-butylamido)silanetitanium (II) 1,4-diphenyl-1,3-butadiene;
(3-(4-methoxyphenyl)-4-methylcyclopentadien-1-yl)dimethyl(t-butylamido)silanetitanium dichloride,
(3-(4-methoxyphenyl)-4-phenylcyclopentadien-1-yl)dimethyl(t-butylamido)silanetitanium dimethyl,
(3-4-methoxyphenyl)-4-phenylcyclopentadien-1-yl)dimethyl(t-butylamido)silanetitanium (II) 1,4-diphenyl-1,3-butadiene;
(3-phenyl-4-methoxycyclopentadien-1-yl)dimethyl(t-butylamido)silanetitanium dichloride,
(3-phenyl-4-methoxycyclopentadien-1-yl)dimethyl(t-butylamido)silanetitanium dimethyl,
(3-phenyl-4-methoxycyclopentadien-1-yl)dimethyl(t-butylamido)silanetitanium (II) 1,4-diphenyl-1,3-butadiene;
(3-phenyl-4-(N,N-dimethylamino)cyclopentadien-1-yl)dimethyl(t-butylamido)silanetitanium dichloride,
(3-phenyl-4-(N,N-dimethylamino)cyclopentadien-1-yl)dimethyl(t-butylamido)silanetitanium dimethyl,
(3-phenyl-4-(N,N-dimethylamino)cyclopentadien-1-yl)dimethyl(t-butylamido)silanetitanium (II) 1,4-diphenyl-1,3-butadiene;
2-methyl-(3,4-di(4-methylphenyl)cyclopentadien-1-yl)dimethyl(t-butylamido)silanetitanium dichloride,
2-methyl-(3,4-di(4-methylphenyl)cyclopentadien-1-yl)dimethyl(t-butylamido)silanetitanium dimethyl,
2-methyl-(3,4-di(4-methylphenyl)cyclopentadien-1-yl)dimethyl(t-butylamido)silanetitanium (II) 1,4-diphenyl-1,3-butadiene;
((2,3-diphenyl)-4-(N,N-dimethylamino)cyclopentadien-1-yl)dimethyl(t-butylamido)silane titanium dichloride,
((2,3-diphenyl)-4-(N,N-dimethylamino)cyclopentadien-1-yl)dimethyl(t-butylamido)silane titanium dimethyl,
((2,3-diphenyl)-4-(N,N-dimethylamino)cyclopentadien-1-yl)dimethyl(t-butylamido)silanetitanium (II) 1,4-diphenyl-1,3-butadiene;
(2,3,4-triphenyl-5-methylcyclopentadien-1-yl)dimethyl(t-butylamido)silanetitanium dichloride,
(2,3,4-triphenyl-5-methylcyclopentadien-1-yl)dimethyl(t-butylamido)silanetitanium dimethyl,
(2,3,4-triphenyl-5-methylcyclopentadien-1-yl)dimethyl(t-butylamido)silanetitanium (II) 1,4-diphenyl-1,3-butadiene;
(3-phenyl-4-methoxycyclopentadien-1-yl)dimethyl(t-butylamido)silanetitanium dichloride,
(3-phenyl-4-methoxycyclopentadien-1-yl)dimethyl(t-butylamido)silanetitanium dimethyl,
(3-phenyl-4-methoxycyclopentadien-1-yl)dimethyl(t-butylamido)silanetitanium (II) 1,4-diphenyl-1,3-butadiene;
(2,3-diphenyl-4-(n-butyl)cyclopentadien-1-yl)dimethyl(t-butylamido)silanetitanium dichloride,
(2,3-diphenyl-4-(n-butyl)cyclopentadien-1-yl)dimethyl(t-butylamido)silanetitanium dimethyl,
(2,3-diphenyl-4-(n-butyl)cyclopentadien-1-yl)dimethyl(t-butylamido)silanetitanium (II) 1,4-diphenyl-1,3-butadiene;
(2,3,4,5-tetraphenylcyclopentadien-1-yl)dimethyl(t-butylamido)silanetitanium dichloride,
(2,3,4,5-tetraphenylcyclopentadien-1-yl)dimethyl(t-butylamido)silanetitanium dimethyl, and
(2,3,4,5-tetraphenylcyclopentadien-1-yl)dimethyl(t-butylamido)silanetitanium (II) 1,4-diphenyl-1,3-butadiene.

Additional examples of suitable metal complexes for use as catalysts herein are polycyclic complexes corresponding to the formula:

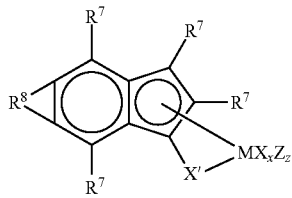

where M is titanium in the +2, +3 or +4 formal oxidation state;

$R^7$ independently each occurrence is hydride, hydrocarbyl, silyl, germyl, halide, hydrocarbyloxy, hydrocarbylsiloxy, hydrocarbylsilylamino, di(hydrocarbyl)amino, hydrocarbyleneamino, di(hydrocarbyl)phosphino, hydrocarbylenephosphino, hydrocarbylsulfido, halo-substituted hydrocarbyl, hydrocarbyloxy-substituted hydrocarbyl, silyl-substituted hydrocarbyl, hydrocarbylsiloxy-substituted hydrocarbyl, hydrocarbylsilylamino-substituted hydrocarbyl, di(hydrocarbyl)amino-substituted hydrocarbyl, hydrocarbyleneamino-substituted hydrocarbyl, di(hydrocarbyl)phosphino-substituted hydrocarbyl, hydrocarbylenephosphino-substituted hydrocarbyl, or hydrocarbylsulfido-substituted hydrocarbyl, said $R^7$ group having up to 40 atoms not counting hydrogen, and optionally two or more of the foregoing groups may together form a divalent derivative;

$R^8$ is a divalent hydrocarbylene- or substituted hydrocarbylene group forming a fused system with the remainder of the metal complex, said $R^8$ containing from 1 to 30 atoms not counting hydrogen;

X' is a divalent moiety, or a moiety comprising one σ-bond and a neutral two electron pair able to form a coordinate-covalent bond to M, said X' comprising boron, or a member of Group 14 of the Periodic Table of the Elements, and also comprising nitrogen, phosphorus, sulfur or oxygen;

X is a monovalent anionic ligand group having up to 60 atoms exclusive of the class of ligands that are cyclic, delocalized, π-bound ligand groups and optionally two X groups together form a divalent ligand group;

Z independently each occurrence is a neutral ligating compound having up to 20 atoms;

x is 0, 1 or 2; and z is zero or 1.

Preferred examples of such complexes are 3-phenyl-substituted s-indecenyl complexes corresponding to the formula:

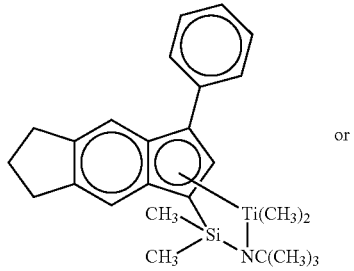

or

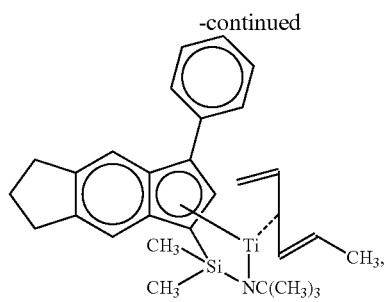

2,3-dimethyl-substituted s-indecenyl complexes corresponding to the formulas:

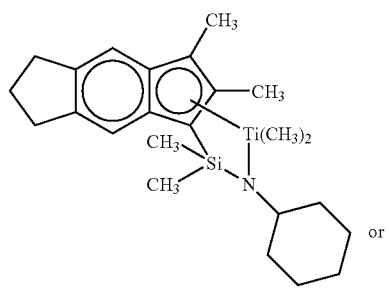

or

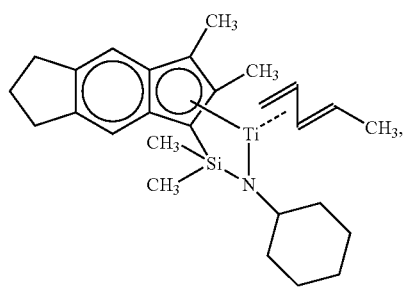

or 2-methyl-substituted s-indecenyl complexes corresponding to the formula:

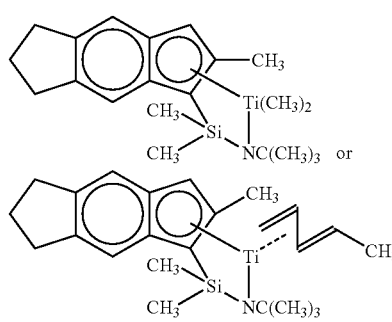

Additional examples of metal complexes that are usefully employed as catalyst (A) according to the present invention include those of the formula:

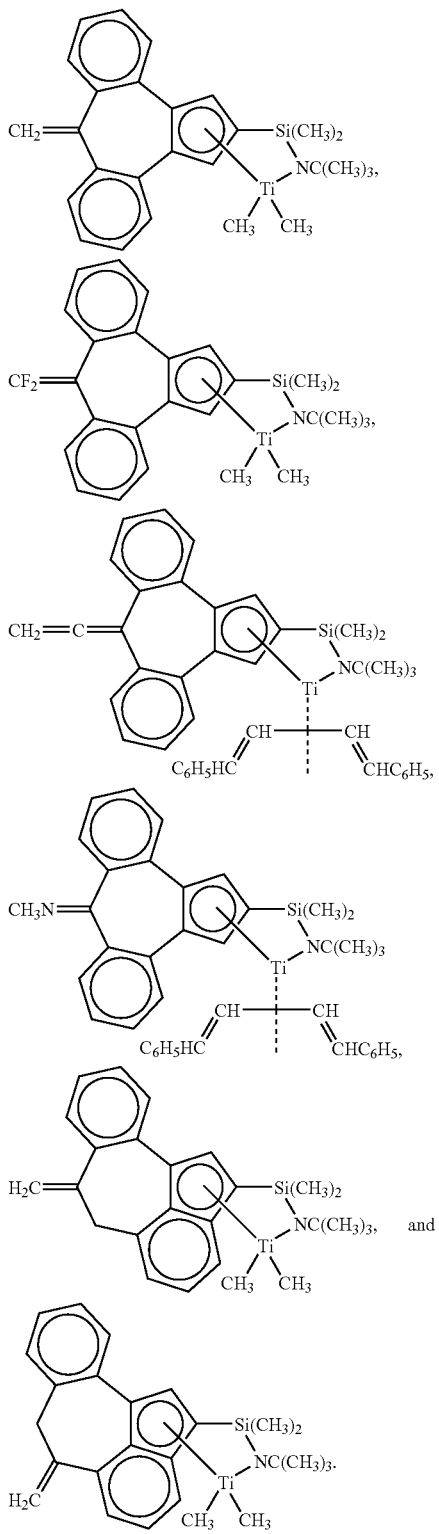

Specific metal complexes include:
(8-methylene-1,8-dihydrodibenzo[e,h]azulen-1-yl)-N-(1,1-dimethylethyl)dimethylsilanamide titanium (II) 1,4-diphenyl-1,3-butadiene,
(8-methylene-1,8-dihydrodibenzo[e,h]azulen-1-yl)-N-(1,1-dimethylethyl)dimethylsilanamide titanium (II) 1,3-pentadiene,
(8-methylene-1,8-dihydrodibenzo[e,h]azulen-1-yl)-N-(1,1-dimethylethyl)dimethylsilanamide titanium (III) 2-(N,N-dimethylamino)benzyl,
(8-methylene-1,8-dihydrodibenzo[e,h]azulen-1-yl)-N-(1,1-dimethylethyl)dimethylsilanamide titanium (IV) dichloride,
(8-methylene-1,8-dihydrodibenzo[e,h]azulen-1-yl)-N-(1,1-dimethylethyl)dimethylsilanamide titanium (IV) dimethyl,
(8-methylene-1,8-dihydrodibenzo[e,h]azulen-1-yl)-N-(1,1-dimethylethyl)dimethylsilanamide titanium (IV) dibenzyl,
(8-difluoromethylene-1,8-dihydrodibenzo[e,h]azulen-1-yl)-N-(1,1-dimethylethyl)dimethylsilanamide titanium (II) 1,4-diphenyl-1,3-butadiene,
(8-difluoromethylene-1,8-dihydrodibenzo[e,h]azulen-1-yl)-N-(1,1-dimethylethyl)dimethylsilanamide titanium (II) 1,3-pentadiene,
(8-difluoromethylene-1,8-dihydrodibenzo[e,h]azulen-1-yl)-N-(1,1-dimethylethyl)dimethylsilanamide titanium (III) 2-(N,N-dimethylamino)benzyl,
(8-difluoromethylene-1,8-dihydrodibenzo[e,h]azulen-1-yl)-N-(1,1-dimethylethyl)dimethylsilanamide titanium (IV) dichloride,
(8-difluoromethylene-1,8-dihydrodibenzo[e,h]azulen-1-yl)-N-(1,1-dimethylethyl)dimethylsilanamide titanium (IV) dimethyl,
(8-difluoromethylene-1,8-dihydrodibenzo[e,h]azulen-1-yl)-N-(1,1-dimethylethyl)dimethylsilanamide titanium (IV) dibenzyl,
(8-methylene-1,8-dihydrodibenzo[e,h]azulen-2-yl)-N-(1,1-dimethylethyl)dimethylsilanamide titanium (II) 1,4-diphenyl-1,3-butadiene,
(8-methylene-1,8-dihydrodibenzo[e,h]azulen-2-yl)-N-(1,1-dimethylethyl)dimethylsilanamide titanium (II) 1,3-pentadiene,
(8-methylene-1,8-dihydrodibenzo[e,h]azulen-2-yl)-N-(1,1-dimethylethyl)dimethylsilanamide titanium (III) 2-(N,N-dimethylamino)benzyl,
(8-methylene-1,8-dihydrodibenzo[e,h]azulen-2-yl)-N-(1,1-dimethylethyl)dimethylsilanamide titanium (IV) dichloride,
(8-methylene-1,8-dihydrodibenzo[e,h]azulen-2-yl)-N-(1,1-dimethylethyl)dimethylsilanamide titanium (IV) dimethyl,
(8-methylene-1,8-dihydrodibenzo[e,h]azulen-2-yl)-N-(1,1-dimethylethyl)dimethylsilanamide titanium (IV) dibenzyl,
(8-difluoromethylene-1,8-dihydrodibenzo[e,h]azulen-2-yl)-N-(1,1-dimethylethyl)dimethylsilanamide titanium (II) 1,4-diphenyl-1,3-butadiene,
(8-difluoromethylene-1,8-dihydrodibenzo[e,h]azulen-2-yl)-N-(1,1-dimethylethyl)dimethylsilanamide titanium (II) 1,3-pentadiene,
(8-difluoromethylene-1,8-dihydrodibenzo[e,h]azulen-2-yl)-N-(1,1-dimethylethyl)dimethylsilanamide titanium (III) 2-(N,N-dimethylamino)benzyl,
(8-difluoromethylene-1,8-dihydrodibenzo[e,h]azulen-2-yl)-N-(1,1-dimethylethyl)dimethylsilanamide titanium (IV) dichloride,
(8-difluoromethylene-1,8-dihydrodibenzo[e,h]azulen-2-yl)-N-(1,1-dimethylethyl)dimethylsilanamide titanium (IV) dimethyl,
(8-difluoromethylene-1,8-dihydrodibenzo[e,h]azulen-2-yl)-N-(1,1-dimethylethyl)dimethylsilanamide titanium (IV) dibenzyl, and mixtures thereof,
especially mixtures of positional isomers.

Further illustrative examples of metal complexes for use according to the present invention correspond to the formula:

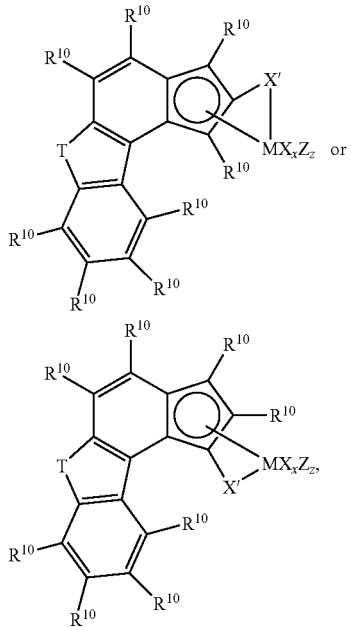

where M is titanium in the +2, +3 or +4 formal oxidation state;

T is —NR$^9$— or —O—;

R$^9$ is hydrocarbyl, silyl, germyl, dihydrocarbylboryl, or halohydrocarbyl or up to 10 atoms not counting hydrogen;

R$^{10}$ independently each occurrence is hydrogen, hydrocarbyl, trihydrocarbylsilyl, trihydrocarbylsilylhydrocarbyl, germyl, halide, hydrocarbyloxy, hydrocarbylsiloxy, hydrocarbylsilylamino, di(hydrocarbyl)amino, hydrocarbyleneamino, di(hydrocarbyl)phosphino, hydrocarbylene-phosphino, hydrocarbylsulfido, halo-substituted hydrocarbyl, hydrocarbyloxy-substituted hydrocarbyl, silyl-substituted hydrocarbyl, hydrocarbylsiloxy-substituted hydrocarbyl, hydrocarbylsilylamino-substituted hydrocarbyl, di(hydrocarbyl)amino-substituted hydrocarbyl, hydrocarbyleneamino-substituted hydrocarbyl, di(hydrocarbyl)phosphino-substituted hydrocarbyl, hydrocarbylenephosphino-substituted hydrocarbyl, or hydrocarbylsulfido-substituted hydrocarbyl, said R$^{10}$ group having up to 40 atoms not counting hydrogen atoms, and optionally two or more of the foregoing adjacent R$^{10}$ groups may together form a divalent derivative thereby forming a saturated or unsaturated fused ring;

X' is a divalent moiety lacking in delocalized π-electrons, or such a moiety comprising one σ-bond and a neutral two electron pair able to form a coordinate-covalent bond to M, said X' comprising boron, or a member of Group 14 of the Periodic Table of the Elements, and also comprising nitrogen, phosphorus, sulfur or oxygen;

X is a monovalent anionic ligand group having up to 60 atoms exclusive of the class of ligands that are cyclic ligand groups bound to M through delocalized π-electrons or two X groups together are a divalent anionic ligand group;

Z independently each occurrence is a neutral ligating compound having up to 20 atoms;

x is 0, 1, 2, or 3; and z is 0 or 1.

Highly preferably T is ═N(CH$_3$), X is halo or hydrocarbyl, x is 2, X' is dimethylsilane, z is 0, and R$^{10}$ each occurrence is hydrogen, a hydrocarbyl, hydrocarbyloxy, dihydrocarbylamino, hydrocarbyleneamino, dihydrocarbylamino-substituted hydrocarbyl group, or hydrocarbyleneamino-substituted hydrocarbyl group of up to 20 atoms not counting hydrogen, and optionally two R$^{10}$ groups may be joined together.

Illustrative metal complexes of the foregoing formula that may be employed in the practice of the present invention further include the following compounds:

(t-butylamido)dimethyl-[6,7]benzo-[4,5:2',3'](1-methyl-isoindol)-(3H)-indene-2-yl)silanetitanium (II) 1,4-diphenyl-1,3-butadiene, (t-butylamido)dimethyl-[6,7]benzo-[4,5:2',3'](1-methyl-isoindol)-(3H)-indene-2-yl)silanetitanium (II) 1,3-pentadiene, (t-butylamido)dimethyl-[6,7]benzo-[4,5:2',3'](1-methyl-isoindol)-(3H)-indene-2-yl)silanetitanium (III) 2-(N,N-dimethylamino)benzyl, (t-butylamido)dimethyl-[6,7]benzo-[4,5:2',3'](1-methyl-isoindol)-(3H)-indene-2-yl)silanetitanium (IV) dichloride, (t-butylamido)dimethyl-[6,7]benzo-[4,5:2',3'](1-methyl-isoindol)-(3H)-indene-2-yl)silanetitanium (IV) dimethyl, (t-butylamido)dimethyl-[6,7]benzo-[4,5:2',3'](1-methyl-isoindol)-(3H)-indene-2-yl)silanetitanium (IV) dibenzyl, (t-butylamido)dimethyl-[6,7]benzo-[4,5:2',3'](1-methyl-isoindol)-(3H)-indene-2-yl)silanetitanium (IV) bis(trimethylsilyl), (cyclohexylamido)dimethyl-[6,7]benzo-[4,5:2',3'](1-methylisoindol)-(3H)-indene-2-yl)silanetitanium (II) 1,4-diphenyl-1,3-butadiene, (cyclohexylamido)dimethyl-[6,7]benzo-[4,5:2',3'](1-methylisoindol)-(3H)-indene-2-yl)silanetitanium (II) 1,3-pentadiene, (cyclohexylamido)dimethyl-[6,7]benzo-[4,5:2',3'](1-methylisoindol)-(3H)-indene-2-yl)silanetitanium (III) 2-(N,N-dimethylamino)benzyl, (cyclohexylamido)dimethyl-[6,7]benzo-[4,5:2',3'](1-methylisoindol)-(3H)-indene-2-yl)silanetitanium (IV) dichloride, (cyclohexylamido)dimethyl-[6,7]benzo-[4,5:2',3'](1-methylisoindol)-(3H)-indene-2-yl)silanetitanium (IV) dimethyl, (cyclohexylamido)dimethyl-[6,7]benzo-[4,5:2',3'](1-methylisoindol)-(3H)-indene-2-yl)silanetitanium (IV) dibenzyl, (cyclohexylamido)dimethyl-[6,7]benzo-[4,5:2',3'](1-methylisoindol)-(3H)-indene-2-yl)silanetitanium (IV) bis(trimethylsilyl), (t-butylamido)di(p-methylphenyl)-[6,7]benzo-[4,5:2',3'](1-methylisoindol)-(3H)-indene-2-yl)silanetitanium (II) 1,4-diphenyl-1,3-butadiene, (t-butylamido)di(p-methylphenyl)-[6,7]benzo-[4,5:2',3'](1-methylisoindol)-(3H)-indene-2-yl)silanetitanium (II) 1,3-pentadiene, (t-butylamido)di(p-methylphenyl)-[6,7]benzo-[4,5:2',3'](1-methylisoindol)-(3H)-indene-2-yl)silanetitanium (III) 2-(N,N-dimethylamino)benzyl, (t-butylamido)di(p-methylphenyl)-[6,7]benzo-[4,5:2',3'](1-methylisoindol)-(3H)-indene-2-yl)silanetitanium (IV) dichloride, (t-butylamido)di(p-methylphenyl)-[6,7]benzo-[4,5:2',3'](1-methylisoindol)-(3H)-indene-2-yl)silanetitanium (IV) dimethyl, (t-butylamido)di(p-methylphenyl)-[6,7]benzo-[4,5:2',3'](1-methylisoindol)-(3H)-indene-2-yl)silanetitanium (IV) dibenzyl, (t-butylamido)di(p-methylphenyl)-[6,7]benzo-[4,5:2',3'](1-methylisoindol)-(3H)-indene-2-yl)silanetitanium (IV) bis(trimethylsilyl),
(cyclohexylamido)di(p-methylphenyl)-[6,7]benzo-[4,5:2',3'](1-methylisoindol)-(3H)-indene-2-yl)silanetitanium (II) 1,4-diphenyl-1,3-butadiene,
(cyclohexylamido)di(p-methylphenyl)-[6,7]benzo-[4,5:2',3'](1-methylisoindol)-(3H)-indene-2-yl)silanetitanium (II) 1,3-pentadiene,
(cyclohexylamido)di(p-methylphenyl)-[6,7]benzo-[4,5:2',3'](1-methylisoindol)-(3H)-indene-2-yl)silanetitanium (III) 2-(N,N-dimethylamino)benzyl,
(cyclohexylamido)di(p-methylphenyl)-[6,7]benzo-[4,5:2',3'](1-methylisoindol)-(3H)-indene-2-yl)silanetitanium (IV) dichloride,
(cyclohexylamido)di(p-methylphenyl)-[6,7]benzo-[4,5:2',3'](1-methylisoindol)-(3H)-indene-2-yl)silanetitanium (IV) dimethyl,
(cyclohexylamido)di(p-methylphenyl)-[6,7]benzo-[4,5:2',3'](1-methylisoindol)-(3H)-indene-2-yl)silanetitanium (IV) dibenzyl; and
(cyclohexylamido)di(p-methylphenyl)-[6,7]benzo-[4,5:2',3'](1-methylisoindol)-(3H)-indene-2-yl)silanetitanium (IV) bis(trimethylsilyl).

Illustrative Group 4 metal complexes that may be employed in the practice of the present invention further include:
(tert-butylamido)(1,1-dimethyl-2,3,4,9,10-η-1,4,5,6,7,8-hexahydronaphthalenyl)dimethylsilanetitaniumdimethyl,
(tert-butylamido)(1,1,2,3-tetramethyl-2,3,4,9,10-η-1,4,5,6,7,8-hexahydronaphthalenyl)dimethylsilanetitaniumdimethyl,
(tert-butylamido)(tetramethyl-$\eta^5$-cyclopentadienyl)dimethylsilanetitanium dibenzyl,
(tert-butylamido)(tetramethyl-$\eta^5$-cyclopentadienyl)-1,2-ethanediyltitanium dimethyl,
(tert-butylamido)(tetramethyl-$\eta^5$-indenyl)dimethylsilanetitanium dimethyl,
(tert-butylamido)(tetramethyl-$\eta^5$-cyclopentadienyl)dimethylsilane titanium (III) 2-(dimethylamino)benzyl;
(tert-butylamido)(tetramethyl-$\eta^5$-cyclopentadienyl)dimethylsilanetitanium (III) allyl,
(tert-butylamido)(tetramethyl-$\eta^5$-cyclopentadienyl)dimethylsilanetitanium (III) 2,4-dimethylpentadienyl,
(tert-butylamido)(tetramethyl-$\eta^5$-cyclopentadienyl)dimethylsilanetitanium (III) 1,4-diphenyl-1,3-butadiene,
(tert-butylamido)(tetramethyl-$\eta^5$-cyclopentadienyl)dimethylsilanetitanium (III) 1,3-pentadiene,
(tert-butylamido)(2-methylindenyl)dimethylsilanetitanium (II) 1,4-diphenyl-1,3-butadiene,
(tert-butylamido)(2-methylindenyl)dimethylsilanetitanium (II) 2,4-hexadiene,
(tert-butylamido)(2-methylindenyl)dimethylsilanetitanium (IV) 2,3-dimethyl-1,3-butadiene,
(tert-butylamido)(2-methylindenyl)dimethylsilanetitanium (IV) isoprene,
(tert-butylamido)(2-methylindenyl)dimethylsilanetitanium (IV) 1,3-butadiene,
(tert-butylamido)(2,3-dimethylindenyl)dimethylsilanetitanium (IV) 2,3-dimethyl-1,3-butadiene,
(tert-butylamido)(2,3-dimethylindenyl)dimethylsilanetitanium (IV) isoprene
(tert-butylamido)(2,3-dimethylindenyl)dimethylsilanetitanium (IV) dimethyl
(tert-butylamido)(2,3-dimethylindenyl)dimethylsilanetitanium (IV) dibenzyl
(tert-butylamido)(2,3-dimethylindenyl)dimethylsilanetitanium (IV) 1,3-butadiene,
(tert-butylamido)(2,3-dimethylindenyl)dimethylsilanetitanium (II) 1,3-pentadiene,
(tert-butylamido)(2,3-dimethylindenyl)dimethylsilanetitanium (II) 1,4-diphenyl-1,3-butadiene,
(tert-butylamido)(2-methylindenyl)dimethylsilanetitanium (II) 1,3-pentadiene,
(tert-butylamido)(2-methylindenyl)dimethylsilanetitanium (IV) dimethyl,
(tert-butylamido)(2-methylindenyl)dimethylsilanetitanium (IV) dibenzyl,
(tert-butylamido)(2-methyl-4-phenylindenyl)dimethylsilanetitanium (II) 1,4-diphenyl-1,3-butadiene,
(tert-butylamido)(2-methyl-4-phenylindenyl)dimethylsilanetitanium (II) 1,3-pentadiene,
(tert-butylamido)(2-methyl-4-phenylindenyl)dimethylsilanetitanium (II) 2,4-hexadiene,
(tert-butylamido)(tetramethyl-$\eta^5$-cyclopentadienyl)dimethyl-silanetitanium (IV) 1,3-butadiene,
(tert-butylamido)(tetramethyl-$\eta^5$-cyclopentadienyl)dimethylsilanetitanium (IV) 2,3-dimethyl-1,3-butadiene,
(tert-butylamido)(tetramethyl-$\eta^5$-cyclopentadienyl)dimethylsilanetitanium (IV) isoprene,
(tert-butylamido)(tetramethyl-$\eta^5$-cyclopentadienyl)dimethyl-silanetitanium (II) 1,4-dibenzyl-1,3-butadiene,
(tert-butylamido)(tetramethyl-$\eta^5$-cyclopentadienyl)dimethylsilanetitanium (II) 2,4-hexadiene,
(tert-butylamido)(tetramethyl-$\eta^5$-cyclopentadienyl)dimethyl-silanetitanium (II) 3-methyl-1,3-pentadiene,
(tert-butylamido)(2,4-dimethylpentadien-3-yl)dimethylsilanetitaniumdimethyl,
(tert-butylamido)(6,6-dimethylcyclohexadienyl)dimethylsilanetitaniumdimethyl,
(tert-butylamido)(1,1-dimethyl-2,3,4,9,10-η-1,4,5,6,7,8-hexahydronaphthalen-4-yl)dimethylsilanetitaniumdimethyl,
(tert-butylamido)(1,1,2,3-tetramethyl-2,3,4,9,10-η-1,4,5,6,7,8-hexahydronaphthalen-4-yl)dimethylsilanetitaniumdimethyl
(tert-butylamido)(tetramethyl-$\eta^5$-cyclopentadienyl methylphenylsilanetitanium (IV) dimethyl,
(tert-butylamido)(tetramethyl-$\eta^5$-cyclopentadienyl methylphenylsilanetitanium (II) 1,4-diphenyl-1,3-butadiene,
1-(tert-butylamido)-2-(tetramethyl-$\eta^5$-cyclopentadienyl) ethanediyltitanium (IV) dimethyl, and
1-(tert-butylamido)-2-(tetramethyl-$\eta^5$-cyclopentadienyl) ethanediyl-titanium (II) 1,4-diphenyl-1,3-butadiene.

Other delocalized, π-bonded complexes, especially those containing other Group 4 metals, will, of course, be apparent to those skilled in the art, and are disclosed among other places in: WO 03/78480, WO 03/78483, WO 02/92610, WO 02/02577, US 2003/0004286 and U.S. Pat. Nos. 6,515,155, 6,555,634, 6,150,297, 6,034,022, 6,268,444, 6,015,868, 5,866,704, and 5,470,993.

The polyvalent Lewis base complexes for use in the present invention also include Group 4 metal derivatives, especially hafnium derivatives of hydrocarbylamine substituted heteroaryl compounds, especially compounds of the formula $R^{11}HN$-T-$R^2$. Preferably the complexes correspond to the formula:

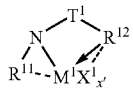

wherein:
$R^{11}$ is selected from alkyl, cycloalkyl, heteroalkyl, cycloheteroalkyl, aryl, and inertly substituted derivatives thereof containing from 1 to 30 atoms not counting hydrogen;

$T^1$ is a divalent bridging group of from 1 to 20 atoms other than hydrogen, preferably a mono- or di-$C_{1-20}$ hydrocarbyl substituted methylene or silane group; and $R^{12}$ is a $C_{6-20}$ heteroaryl group containing Lewis base functionality, especially a pyridin-2-yl- or substituted pyridin-2-yl group;

and in the metal complex, $M^1$ is a Group 4 metal, preferably hafnium;

$X^1$ is an anionic, neutral or dianionic ligand group;

x' is a number from 0 to 5 indicating the number of such $X^1$ groups; and bonds, optional bonds and electron donative interactions are represented by lines, dotted lines and arrows respectively.

Preferred complexes are those wherein ligand formation results from hydrogen elimination from the amine group and optionally from the loss of one or more additional groups, especially from $R^{12}$. In addition, electron donation from the Lewis base functionality, preferably an electron pair, provides additional stability to the metal center. Preferred examples of the foregoing polyfunctional Lewis base compounds and the resulting metal complexes correspond to the formulas:

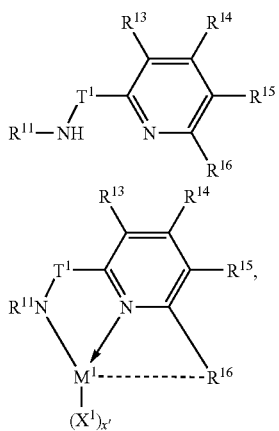

wherein
$M^1$, $X^1$, x', $R^{11}$ and $T^1$ are as previously defined,
$R^{13}$, $R^{14}$, $R^{15}$ and $R^{16}$ are hydrogen, halo, or an alkyl, cycloalkyl, heteroalkyl, heterocycloalkyl, aryl, or silyl group of up to 20 atoms not counting hydrogen, or adjacent $R^{13}$, $R^{14}$, $R^{15}$ or $R^{16}$ groups may be joined together thereby forming fused ring derivatives, and bonds, optional bonds and electron pair donative interactions are represented by lines, dotted lines and arrows respectively.

More preferred examples of the foregoing difunctional Lewis base compounds and metal complexes correspond to the formula:

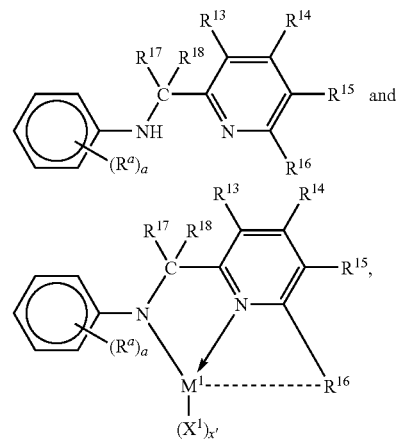

wherein
$M^1$, $X^1$, and x' are as previously defined,
$R^{13}$, $R^{14}$, $R^{15}$ and $R^{16}$ are as previously defined, preferably $R^{13}$, $R^{14}$, and $R^{15}$ are hydrogen, or $C_{1-4}$ alkyl, and $R^{16}$ is $C_{6-20}$ aryl, most preferably naphthalenyl;

$R^a$ independently each occurrence is $C_{1-4}$ alkyl, and a is 1-5, most preferably $R^a$ in two ortho-positions is isopropyl or t-butyl;

$R^{17}$ and $R^{18}$ independently each occurrence are hydrogen, halogen, or a $C_{1-20}$ alkyl or aryl group, most preferably one of $R^{17}$ and $R^{18}$ is hydrogen and the other is a $C_{6-20}$ aryl group, especially a fused polycyclic aryl group, most preferably an anthracenyl group, and bonds, optional bonds and electron pair donative interactions are represented by lines, dotted lines and arrows respectively.

Highly preferred polyfunctional Lewis base compounds and metal complexes for use herein correspond to the formula:

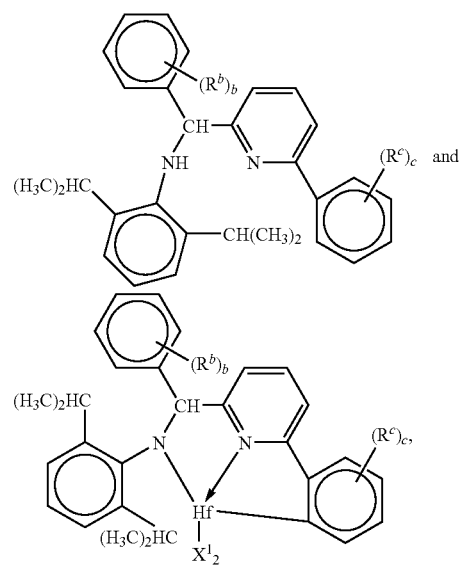

wherein $X^1$ each occurrence is halide, N,N-dimethylamido, or $C_{1-4}$ alkyl, and preferably each occurrence X is methyl;

$R^b$ independently each occurrence is hydrogen, halogen, $C_{1-20}$ alkyl, or $C_{6-20}$ aryl, or two adjacent $R^b$ groups are joined together thereby forming a ring, and b is 1-5; and $R^C$ independently each occurrence is hydrogen, halogen, $C_{1-20}$ alkyl, or $C_{6-20}$ aryl, or two adjacent $R^C$ groups are joined together thereby forming a ring, and c is 1-5.

Most highly preferred examples of metal complexes for use according to the present invention are complexes of the following formulas:

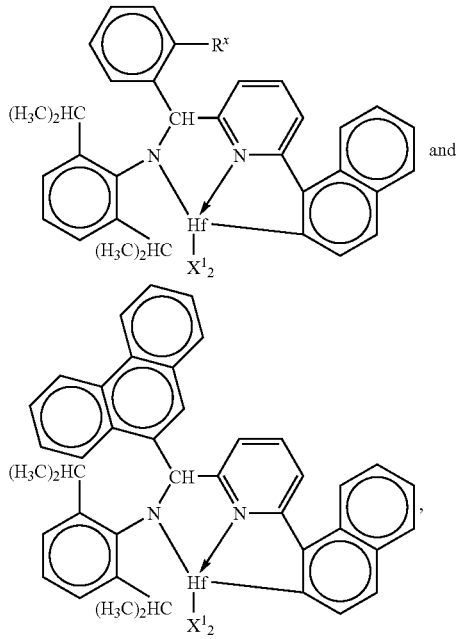

and wherein $R^x$ is $C_{1-4}$ alkyl or cycloalkyl, preferably methyl or isopropyl; and $X^1$ each occurrence is halide, N,N-dimethylamido, or $C_{1-4}$ alkyl, preferably methyl.

Specific examples of such metal complexes include:

[N-(2,6-di(1-methylethyl)phenyl)amido)(o-tolyl)(α-naphthalen-2-diyl(6-pyridin-2-diyl)methane)]hafnium dimethyl;

[N-(2,6-di(1-methylethyl)phenyl)amido)(o-tolyl)(α-naphthalen-2-diyl(6-pyridin-2-diyl)methane)]hafnium di(N,N-dimethylamido);

[N-(2,6-di(1-methylethyl)phenyl)amido)(o-tolyl)(α-naphthalen-2-diyl(6-pyridin-2-diyl)methane)]hafnium dichloride;

[N-(2,6-di(1-methylethyl)phenyl)amido)(2-isopropylphenyl)(α-naphthalen-2-diyl(6-pyridin-2-diyl)methane)] hafnium dimethyl;

[N-(2,6-di(1-methylethyl)phenyl)amido)(2-isopropylphenyl)(α-naphthalen-2-diyl(6-pyridin-2-diyl)methane)] hafnium di(N,N-dimethylamido);

[N-(2,6-di(1-methylethyl)phenyl)amido)(2-isopropylphenyl)(α-naphthalen-2-diyl(6-pyridin-2-diyl)methane)] hafnium dichloride;

[N-(2,6-di(1-methylethyl)phenyl)amido)(phenanthren-5-yl) (α-naphthalen-2-diyl(6-pyridin-2-diyl)methane)]hafnium dimethyl;

[N-(2,6-di(1-methylethyl)phenyl)amido)(phenanthren-5-yl) (α-naphthalen-2-diyl(6-pyridin-2-diyl)methane)]hafnium di(N,N-dimethylamido); and

[N-(2,6-di(1-methylethyl)phenyl)amido)(phenanthren-5-yl) (α-naphthalen-2-diyl(6-pyridin-2-diyl)methane)]hafnium dichloride.

Under the reaction conditions used to prepare the metal complexes used in the present invention, it has been discovered that the hydrogen of the 2-position of the α-naphthalene group substituted at the 6-position of the pyridin-2-yl group is subject to elimination, thereby uniquely forming metal complexes wherein the metal is covalently bonded to both the resulting amide group and to the 2-position of the α-naphthalenyl group, as well as stabilized by coordination to the pyridinyl nitrogen atom through the electron pair of the nitrogen atom.

The foregoing polyvalent Lewis base complexes are conveniently prepared by standard metallation and ligand exchange procedures involving a source of the transition metal and the neutral polyfunctional ligand source. The complexes may also be prepared by means of an amide elimination and hydrocarbylation process starting from the corresponding Group 4 metal tetraamide and a hydrocarbylating agent, such as trimethylaluminum. Other techniques may be used as well. These complexes are known from the disclosures of, U.S. Pat. Nos. 6,320,005 and 6,103,657, PCT publications WO 02/38628 and WO 03/40195, and U.S. Ser. No. 10/429,024, filed May 2, 2003.

Suitable metal compounds additional include Group 4-10 derivatives corresponding to the formula:

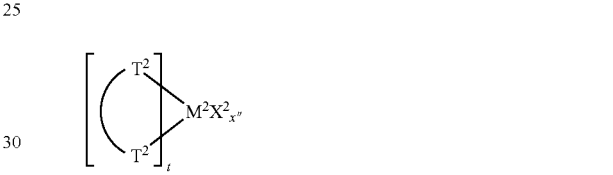

wherein $M^2$ is a metal of Groups 4-10 of the Periodic Table of the elements, preferably Group 4, Ni(II) or Pd(II), most preferably zirconium or hafnium;

$T^2$ independently each occurrence is a nitrogen, oxygen or phosphorus containing group;

$X^2$ is halo, hydrocarbyl, or hydrocarbyloxy;

t is one or two;

x" is a number selected to provide charge balance;

and $T^2$ and N are linked by a bridging ligand.

Such catalysts have been previously disclosed in *J. Am. Chem. Soc.*, 118, 267-268 (1996), *J. Am. Chem. Soc.*, 117, 6414-6415 (1995), and *Organometallics*, 16, 1514-1516, (1997), among other disclosures.

Preferred examples of the foregoing metal complexes are aromatic diimine or aromatic dioxyimine complexes of Group 4 metals, especially zirconium, corresponding to the formula:

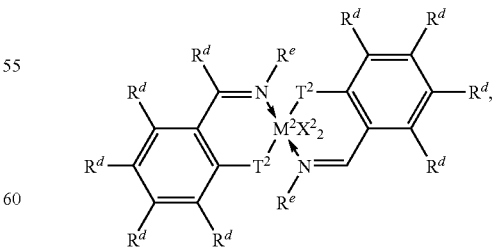

wherein;

$M^2$, $X^2$ and $T^2$ are as previously defined;

$R^d$ independently each occurrence is hydrogen, halogen, or $R^e$; and $R^e$ independently each occurrence is $C_{1-10}$ hydrocarbyl, preferably $C_{1-4}$ alkyl.

Additional suitable metal complexes for use herein include derivatives of Group 6 metals, especially compounds corresponding to the formula: $M^3(OR^f)_u(NR^f_2)_r X^3_{v-u-r}$ wherein $M^3$ is a Group 6 metal, especially chromium in the +3 formal oxidation state;

$R^f$ independently in each occurrence is an alkyl group of from 3 to 20 carbons, a cycloalkyl group of from 5 to 20 carbons, an aryl or alkylaryl group of from 6 to 20 carbons, or a tri($C_{1-20}$)hydrocarbylsilyl group, and optionally two $R^f$ groups on the same or adjacent amide groups may be joined together thereby forming a heterocycloaliphatic ring, or an alkyl-, aryl-, cycloalkyl-, or trihydrocarbylsilyl-substituted derivative thereof;

$X^3$ is an anionic ligand of up to 20 atoms not counting hydrogen, and optionally one or more $X^3$ groups and/or one or more $OR^f$ or $NR^f_2$ groups may be joined together to form an aliphatic or aromatic ring, u and r are numbers greater than or equal to 0 and less than or equal to v, and v is the valence of $M^3$.

Preferred $R^f$ groups include secondary or tertiary alkyl groups, aryl, alkylaryl, and trihydrocarbylsilyl groups of from 3 to 20 carbons, or two $R^f$ groups on a single amide together are a $C_{5-12}$ alkylene group. Most preferably $R^f$ each occurrence is isopropyl, cyclohexyl or trimethylsilyl.

Preferred $X^3$ groups include hydride, halide, hydrocarbyl, trihydrocarbylsilyl, hydrocarbyloxy, and trihydrocarbylsiloxy of up to 10 atoms not counting hydrogen, most preferably chloride or methyl.

Additional examples of suitable Group 6 metal compounds include chromium tris(bis(trimethylsilyl)amide), chromium tris(diisopropylamide), chromium tris(diphenylamide), chromium tris(di(2-methylphenyl)amide), chromium tris(dicyclohexylamide), and chromium tris(2,2,6,6-tetramethylpiperdyl). Preferred Group 6 metal compounds are chromium tris(bis(trimethylsilyl)amide) and chromium tris(diisopropylamide). The group 6 metal compounds may be readily prepared by reaction of the corresponding trialkyl chromium compound with the metallated salt of the desired ligand in an ether solvent followed by recovery from an aliphatic hydrocarbon, by the technique previously disclosed in *J.C.S., Dalton*, (1972), p 1580-1584, or by any other suitable technique.

Additional suitable compounds include metal complexes of hydroxyaryl substituted bis(aryloxy) ligands of the formula: $(HOAr^2O)_2T^3$. Preferably, such complexes correspond to the formula:

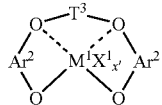

wherein:

$T^3$ is a divalent bridging group of from 2 to 20 atoms not counting hydrogen, preferably a substituted or unsubstituted, $C_{3-6}$ alkylene group; and $Ar^2$ independently each occurrence is a $C_{6-20}$ arylene or inertly substituted arylene group;

$M^1$ is a Group 4 metal, preferably hafnium;

$X^1$ is an anionic, neutral or dianionic ligand group;

x' is a number from 0 to 5 indicating the number of such $X^1$ groups; and bonds, optional bonds and electron donative interactions are represented by lines, dotted lines and arrows respectively.

Preferred examples of the foregoing metal complexes correspond to the following formula:

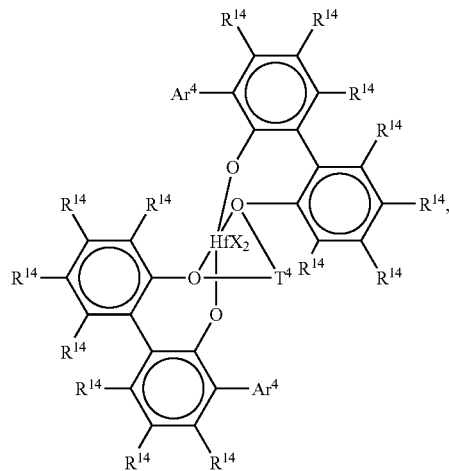

where $Ar^4$ is $C_{6-20}$ aryl or inertly substituted derivatives thereof, especially 3,5-di(isopropyl)phenyl, 3,5-di(isobutyl)phenyl, dibenzo-1H-pyrrole-1-yl, or anthracen-5-yl, and $T^4$ independently each occurrence is $C_{3-6}$ alkylene or an inertly substituted derivative thereof;

$R^{14}$ independently each occurrence is hydrogen, halo, hydrocarbyl, trihydrocarbylsilyl, or trihydrocarbylsilylhydrocarbyl of up to 50 atoms not counting hydrogen; and X, independently each occurrence is halo or a hydrocarbyl or trihydrocarbylsilyl group of up to 20 atoms not counting hydrogen, or 2X groups together are a divalent derivative of the foregoing hydrocarbyl or trihydrocarbylsilyl groups.

Especially preferred are compounds of the formula:

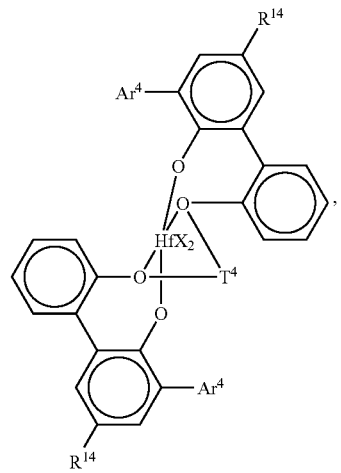

wherein $Ar^4$ is 3,5-di(isopropyl)phenyl, 3,5-di(isobutyl)phenyl, dibenzo-1H-pyrrole-1-yl, or anthracen-5-yl, $R^{14}$ is hydrogen, halo, or $C_{1-4}$ alkyl, especially methyl $T^4$ is propan-1,3-diyl or butan-1,4-diyl, and X is chloro, methyl or benzyl.

A most highly preferred metal compound corresponds to the formula:

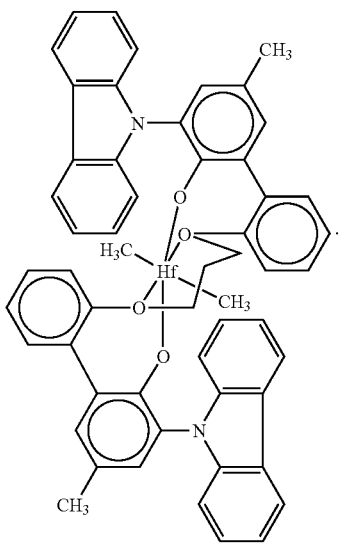

Activator Compounds

The metal complexes are rendered catalytically active by combination with a cation forming cocatalyst, such as those previously known in the art for use with transition metal olefin polymerization complexes. Suitable cation forming cocatalysts for use herein include neutral Lewis acids, such as $C_{1-30}$ hydrocarbyl substituted Group 13 compounds, especially tri (hydrocarbyl)aluminum- or tri(hydrocarbyl)boron compounds and halogenated (including perhalogenated) derivatives thereof, having from 1 to 10 carbons in each hydrocarbyl or halogenated hydrocarbyl group, more especially perfluorinated tri(aryl)boron compounds, and most especially tris(pentafluorophenyl)boron; nonpolymeric, compatible, non-coordinating, ion forming compounds (including the use of such compounds under oxidizing conditions), especially the use of ammonium-, phosphonium-, oxonium-, carbonium-, silylium- or sulfonium-salts of compatible, noncoordinating anions, or ferrocenium-, lead- or silver salts of compatible, noncoordinating anions; and combinations of the foregoing cation forming cocatalysts and techniques. The foregoing activating cocatalysts and activating techniques have been previously taught with respect to different metal complexes for olefin polymerizations in the following references: EP-A-277,003, U.S. Pat. No. 5,153,157, U.S. Pat. No. 5,064,802, U.S. Pat. No. 5,321,106, U.S. Pat. No. 5,721,185, U.S. Pat. No. 5,350,723, U.S. Pat. No. 5,425,872, U.S. Pat. No. 5,625,087, U.S. Pat. No. 5,883,204, U.S. Pat. No. 5,919,983, U.S. Pat. No. 5,783,512, WO 99/15534, and WO99/42467.

Combinations of neutral Lewis acids, especially the combination of a trialkyl aluminum compound having from 1 to 4 carbons in each alkyl group and a halogenated tri(hydrocarbyl)boron compound having from 1 to 20 carbons in each hydrocarbyl group, especially tris(pentafluorophenyl)boron, further combinations of such neutral Lewis acid mixtures with a polymeric or oligomeric alumoxane, and combinations of a single neutral Lewis acid, especially tris(pentafluorophenyl)boron with a polymeric or oligomeric alumoxane may be used as activating cocatalysts. Preferred molar ratios of metal complex:tris(pentafluorophenylboron:alumoxane are from 1:1:1 to 1:5:20, more preferably from 1:1:1.5 to 1:5:10.

Suitable ion forming compounds useful as cocatalysts in one embodiment of the present invention comprise a cation which is a Bronsted acid capable of donating a proton, and a compatible, noncoordinating anion, $A^-$. As used herein, the term "noncoordinating" means an anion or substance which either does not coordinate to the transition metal containing precursor complex and the catalytic derivative derived therefrom, or which is only weakly coordinated to such complexes thereby remaining sufficiently labile to be displaced by a neutral Lewis base. A noncoordinating anion specifically refers to an anion which when functioning as a charge balancing anion in a cationic metal complex does not transfer an anionic substituent or fragment thereof to said cation thereby forming neutral complexes. "Compatible anions" are anions which are not degraded to neutrality when the initially formed complex decomposes and are noninterfering with desired subsequent polymerization or other uses of the complex.

Preferred anions are those containing a single coordination complex comprising a charge-bearing metal or metalloid core which anion is capable of balancing the charge of the active catalyst species (the metal cation) which may be formed when the two components are combined. Also, said anion should be sufficiently labile to be displaced by olefinic, diolefinic and acetylenically unsaturated compounds or other neutral Lewis bases such as ethers or nitrites. Suitable metals include, but are not limited to, aluminum, gold and platinum. Suitable metalloids include, but are not limited to, boron, phosphorus, and silicon. Compounds containing anions which comprise coordination complexes containing a single metal or metalloid atom are, of course, well known and many, particularly such compounds containing a single boron atom in the anion portion, are available commercially.

Preferably such cocatalysts may be represented by the following general formula:

$$(L^*-H)_g^+(A)^{g-}$$

wherein:

L* is a neutral Lewis base;

$(L^*-H)^+$ is a conjugate Bronsted acid of L*;

$A^{g-}$ is a noncoordinating, compatible anion having a charge of g–, and g is an integer from 1 to 3.

More preferably $A^{g-}$ corresponds to the formula: $[M'Q_4]^-$;

wherein:

M' is boron or aluminum in the +3 formal oxidation state; and

Q independently each occurrence is selected from hydride, dialkylamido, halide, hydrocarbyl, hydrocarbyloxide, halo-substituted-hydrocarbyl, halosubstituted hydrocarbyloxy, and halo-substituted silylhydrocarbyl radicals (including perhalogenated hydrocarbyl-perhalogenated hydrocarbyloxy- and perhalogenated silylhydrocarbyl radicals), said Q having up to 20 carbons with the proviso that in not more than one occurrence is Q halide. Examples of suitable hydrocarbyloxide Q groups are disclosed in U.S. Pat. No. 5,296,433.

In a more preferred embodiment, d is one, that is, the counter ion has a single negative charge and is $A^-$. Activating cocatalysts comprising boron which are particularly useful in the preparation of catalysts of this invention may be represented by the following general formula:

$$(L^*-H)^+(BQ_4)^-;$$

wherein:

L* is as previously defined;

B is boron in a formal oxidation state of 3; and

Q is a hydrocarbyl-, hydrocarbyloxy-, fluorinated hydrocarbyl-, fluorinated hydrocarbyloxy-, or fluorinated silylhydrocarbyl-group of up to 20 nonhydrogen atoms, with the proviso that in not more than one occasion is Q hydrocarbyl.

Preferred Lewis base salts are ammonium salts, more preferably trialkylammonium salts containing one or more $C_{12-40}$ alkyl groups. Most preferably, Q is each occurrence a fluorinated aryl group, especially, a pentafluorophenyl group.

Illustrative, but not limiting, examples of boron compounds which may be used as an activating cocatalyst in the preparation of the improved catalysts of this invention are tri-substituted ammonium salts such as:
trimethylammonium tetrakis(pentafluorophenyl)borate,
triethylammonium tetrakis(pentafluorophenyl)borate,
tripropylammonium tetrakis(pentafluorophenyl)borate,
tri(n-butyl)ammonium tetrakis(pentafluorophenyl)borate,
tri(sec-butyl)ammonium tetrakis(pentafluorophenyl)borate,
N,N-dimethylanilinium tetrakis(pentafluorophenyl)borate,
N,N-dimethylanilinium n-butyltris(pentafluorophenyl)borate,
N,N-dimethylanilinium benzyltris(pentafluorophenyl)borate,
N,N-dimethylanilinium tetrakis(4-(t-butyldimethylsilyl)-2,3,5,6-tetrafluorophenyl)borate,
N,N-dimethylanilinium tetrakis(4-(triisopropylsilyl)-2,3,5,6-tetrafluorophenyl)borate,
N,N-dimethylanilinium pentafluorophenoxytris(pentafluorophenyl)borate,
N,N-diethylanilinium tetrakis(pentafluorophenyl)borate,
N,N-dimethyl-2,4,6-trimethylanilinium tetrakis(pentafluorophenyl)borate,
dimethyloctadecylammonium tetrakis(pentafluorophenyl)borate,
methyldioctadecylammonium tetrakis(pentafluorophenyl)borate,
dialkyl ammonium salts such as:
di-(i-propyl)ammonium tetrakis(pentafluorophenyl)borate,
methyloctadecylammonium tetrakis(pentafluorophenyl)borate,
methyloctadodecylammonium tetrakis(pentafluorophenyl)borate, and
dioctadecylammonium tetrakis(pentafluorophenyl)borate;
tri-substituted phosphonium salts such as:
triphenylphosphonium tetrakis(pentafluorophenyl)borate,
methyldioctadecylphosphonium tetrakis(pentafluorophenyl)borate, and
tri(2,6-dimethylphenyl)phosphonium tetrakis(pentafluorophenyl)borate;
di-substituted oxonium salts such as:
diphenyloxonium tetrakis(pentafluorophenyl)borate,
di(o-tolyl)oxonium tetrakis(pentafluorophenyl)borate, and
di(octadecyl)oxonium tetrakis(pentafluorophenyl)borate;
di-substituted sulfonium salts such as:
di(o-tolyl)sulfonium tetrakis(pentafluorophenyl)borate, and
methylcotadecylsulfonium tetrakis(pentafluorophenyl)borate.

Preferred (L*-H)$^+$ cations are methyldioctadecylammonium cations, dimethyloctadecylammonium cations, and ammonium cations derived from mixtures of trialkyl amines containing one or 2 $C_{14-18}$ alkyl groups.

Another suitable ion forming, activating cocatalyst comprises a salt of a cationic oxidizing agent and a noncoordinating, compatible anion represented by the formula:

$$(Ox^{h+})_g(A^{g-})_h,$$

wherein:

$Ox^{h+}$ is a cationic oxidizing agent having a charge of h+;

h is an integer from 1 to 3; and $A^{g-}$ and g are as previously defined.

Examples of cationic oxidizing agents include: ferrocenium, hydrocarbyl-substituted ferrocenium, $Ag^+$, or $Pb^{+2}$. Preferred embodiments of $A^{g-}$ are those anions previously defined with respect to the Bronsted acid containing activating cocatalysts, especially tetrakis(pentafluorophenyl)borate.

Another suitable ion forming, activating cocatalyst comprises a compound which is a salt of a carbenium ion and a noncoordinating, compatible anion represented by the formula:

$$[C]^+A^-$$

wherein:

$[C]^+$ is a $C_{1-20}$ carbenium ion; and $A^-$ is a noncoordinating, compatible anion having a charge of −1. A preferred carbenium ion is the trityl cation, that is triphenylmethylium.

A further suitable ion forming, activating cocatalyst comprises a compound which is a salt of a silylium ion and a noncoordinating, compatible anion represented by the formula:

$$(Q^1{}_3Si)^+A^-$$

wherein:

$Q^1$ is $C_{1-10}$ hydrocarbyl, and $A^-$ is as previously defined.

Preferred silylium salt activating cocatalysts are trimethylsilylium tetrakispentafluorophenylborate, triethylsilylium tetrakispentafluorophenylborate and ether substituted adducts thereof. Silylium salts have been previously generically disclosed in *J. Chem. Soc. Chem. Comm.*, 1993, 383-384, as well as Lambert, J. B., et al., *Organometallics*, 1994, 13, 2430-2443. The use of the above silylium salts as activating cocatalysts for addition polymerization catalysts is disclosed in U.S. Pat. No. 5,625,087.

Certain complexes of alcohols, mercaptans, silanols, and oximes with tris(pentafluorophenyl)boron are also effective catalyst activators and may be used according to the present invention. Such cocatalysts are disclosed in U.S. Pat. No. 5,296,433.

Suitable activating cocatalysts for use herein also include polymeric or oligomeric alumoxanes, especially methylalumoxane (MAO), triisobutyl aluminum modified methylalumoxane (MMAO), or isobutylalumoxane; Lewis acid modified alumoxanes, especially perhalogenated tri(hydrocarbyl)aluminum- or perhalogenated tri(hydrocarbyl)boron modified alumoxanes, having from 1 to 10 carbons in each hydrocarbyl or halogenated hydrocarbyl group, and most especially tris(pentafluorophenyl)boron modified alumoxanes. Such cocatalysts are previously disclosed in U.S. Pat. Nos. 6,214,760, 6,160,146, 6,140,521, and 6,696,379.

A class of cocatalysts comprising non-coordinating anions generically referred to as expanded anions, further disclosed in U.S. Pat. No. 6,395,671, may be suitably employed to activate the metal complexes of the present invention for olefin polymerization. Generally, these cocatalysts (illustrated by those having imidazolide, substituted imidazolide, imidazolinide, substituted imidazolinide, benzimidazolide, or substituted benzimidazolide anions) may be depicted as follows:

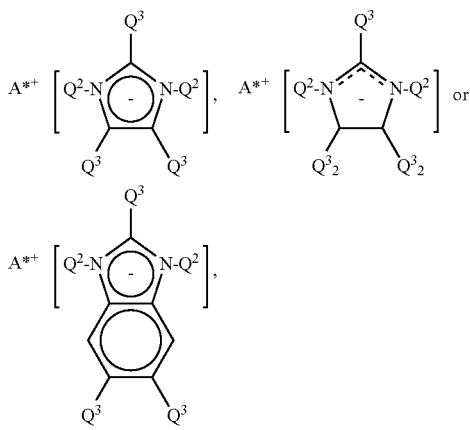

wherein:

A*+ is a cation, especially a proton containing cation, and preferably is a trihydrocarbyl ammonium cation containing one or two $C_{10-40}$ alkyl groups, especially a methyldi($C_{14-20}$ alkyl)ammonium cation, $Q^3$, independently each occurrence, is hydrogen or a halo, hydrocarbyl, halocarbyl, halohydrocarbyl, silylhydrocarbyl, or silyl, (including mono-, di- and tri(hydrocarbyl)silyl) group of up to 30 atoms not counting hydrogen, preferably $C_{1-20}$ alkyl, and $Q^2$ is tris(pentafluorophenyl)borane or tris(pentafluorophenyl)alumane).

Examples of these catalyst activators include trihydrocarbylammonium-salts, especially, methyldi($C_{14-20}$ alkyl)ammonium-salts of:

bis(tris(pentafluorophenyl)borane)imidazolide,
bis(tris(pentafluorophenyl)borane)-2-undecylimidazolide,
bis(tris(pentafluorophenyl)borane)-2-heptadecylimidazolide,
bis(tris(pentafluorophenyl)borane)-4,5-bis(undecyl)imidazolide,
bis(tris(pentafluorophenyl)borane)-4,5-bis(heptadecyl)imidazolide,
bis(tris(pentafluorophenyl)borane)imidazolinide,
bis(tris(pentafluorophenyl)borane)-2-undecylimidazolinide,
bis(tris(pentafluorophenyl)borane)-2-heptadecylimidazolinide,
bis(tris(pentafluorophenyl)borane)-4,5-bis(undecyl)imidazolinide,
bis(tris(pentafluorophenyl)borane)-4,5-bis(heptadecyl)imidazolinide,
bis(tris(pentafluorophenyl)borane)-5,6-dimethylbenzimidazolide,
bis(tris(pentafluorophenyl)borane)-5,6-bis(undecyl)benzimidazolide,
bis(tris(pentafluorophenyl)alumane)imidazolide,
bis(tris(pentafluorophenyl)alumane)-2-undecylimidazolide,
bis(tris(pentafluorophenyl)alumane)-2-heptadecylimidazolide,
bis(tris(pentafluorophenyl)alumane)-4,5-bis(undecyl)imidazolide,
bis(tris(pentafluorophenyl)alumane)-4,5-bis(heptadecyl)imidazolide,
bis(tris(pentafluorophenyl)alumane)imidazolinide,
bis(tris(pentafluorophenyl)alumane)-2-undecylimidazolinide,
bis(tris(pentafluorophenyl)alumane)-2-heptadecylimidazolinide,
bis(tris(pentafluorophenyl)alumane)-4,5-bis(undecyl)imidazolinide,
bis(tris(pentafluorophenyl)alumane)-4,5-bis(heptadecyl)imidazolinide,
bis(tris(pentafluorophenyl)alumane)-5,6-dimethylbenzimidazolide, and
bis(tris(pentafluorophenyl)alumane)-5,6-bis(undecyl)benzimidazolide.

Other activators include those described in PCT publication WO 98/07515 such as tris(2,2', 2''-nonafluorobiphenyl) fluoroaluminate. Combinations of activators are also contemplated by the invention, for example, alumoxanes and ionizing activators in combinations, see for example, EP-A-0 573120, PCT publications WO 94/07928 and WO 95/14044 and U.S. Pat. Nos. 5,153,157 and 5,453,410. WO 98/09996 describes activating catalyst compounds with perchlorates, periodates and iodates, including their hydrates. WO 99/18135 describes the use of organoboroaluminum activators. WO 03/10171 discloses catalyst activators that are adducts of Bronsted acids with Lewis acids. Other activators or methods for activating a catalyst compound are described in for example, U.S. Pat. Nos. 5,849,852, 5,859,653, 5,869,723, EP-A-615981, and PCT publication WO 98/32775. All of the foregoing catalyst activators as well as any other know activator for transition metal complexes may be employed alone or in combination according to the present invention.

Polymerization Modifiers

The polymerization modifier (PM) compositions for use in the present invention in the most general sense comprise the reaction product of at least two reagents, such as one or more Lewis acids with one or more organic protonating reagents. It should be appreciated by one of skill in the art that the resulting product may contain a mixture of species, including equilibria between various species and dynamic, interconverting compounds. In one embodiment of the invention, the reaction mixture formed upon combining the foregoing reagents in a suitable diluent, preferably a hydrocarbon such as hexane or heptane, is preferred for use, rather than the purified and/or isolated reaction product itself.

Suitable Lewis acids are compounds of the formula: $[M^4A^1_{x'}G_{y'}]_{z'}$, wherein:

$M^4$ is a metal of Groups 2-13, Ge, Sn, or Bi;

$A^1$ is independently an anionic or polyanionic ligand;

x' is a number greater than zero and less than or equal to 6;

G is a neutral Lewis base, optionally bound to $A^1$;

y' is a number from 0-4;

z' is a number from 1 to 10.

Preferably, the Lewis acids are metal compounds of the general formula: $M^4A^1_{x'}G_{y'}$, wherein $M^4$ is a metal of Groups 2-13, Ge, Sn, or Bi; $A^1$ is independently an anionic ligand; x' is an integer and is equal to the valence of $M^4$; G is a neutral Lewis base; and y' is a number from 0-4. More preferably, $M^4$ is Mg, B, Ga, Al, or Zn; $A^1$ is $C_{1-20}$ hydrocarbyl or inertly substituted hydrocarbyl, especially $C_{1-12}$ alkyl or aryl. Preferred inert substituents include halide, trimethylsilyl, haloaryl, and haloalkyl.

The organic protonating reagents used in the present invention to form polymerization modifiers include compounds of the formula: $[(H-J^1)_{z''}A^2]_{z'''}$, wherein:

$J^1$ is $NA^3$, $PA^3$, S, or O, z'' is 1 or 2, $A^2$ is $C_{1-20}$ hydrocarbyl or inertly substituted hydrocarbyl, tri($C_{1-10}$hydrocarbyl)silyl, or a polyvalent derivative thereof, $A^3$ is hydrogen, $C_{1-20}$ hydrocarbyl or inertly substituted hydrocarbyl, or a covalent bond (when $A^2$ is a divalent ligand group and z'' is one); and z''' is a number from 1 to 10.

Preferred organic protonating reagents include compounds of the formula: $(H-J^1)_{z''}A^2$, wherein $J^1$ is $NA^3$, $PA^3$, S, or O, and $z''$ is 1 or 2; and $A^2$ is $C_{1-20}$ hydrocarbyl or inertly substituted hydrocarbyl, tri($C_{1-4}$hydrocarbyl)silyl, or a divalent derivative thereof, especially $C_{1-12}$ alkyl, 1,4-butylene, tri($C_{1-4}$alkyl)silyl, or aryl, and $A^3$ is hydrogen, $C_{1-20}$ hydrocarbyl or inertly substituted hydrocarbyl, or a covalent bond. Preferred inert substituents are halide, trimethylsilyl, haloaryl, or haloalkyl.

By using a polymerization modifier according to the present invention, one or more process or product properties is beneficially affected. Examples include the ability to prepare copolymers of ethylene and one or more comonomers, especially 1-butene, 4-methyl-1-pentene, 1-hexene, 1-octene or styrene, having higher or lower comonomer incorporation at equivalent polymerization conditions or alternatively, preparing equivalent copolymers at higher polymerization temperatures or lower comonomer concentrations in the reaction mixture. Another beneficial feature of the use of a polymerization modifier may be greater selectivity in product formation as determined by narrower or broader molecular weight distribution (Mw/Mn) of homopolymers and copolymer products or a relative lack of formation or reduction in formation of a particular species, such as a polymer fraction having differentiated crystallinity, solubility, tacticity, melting point, melt flow index, comonomer content, or other physical property. A further desirable result of the use of a PM may be improved process properties such as improved monomer conversion efficiency. Finally, in another embodiment, candidate PM materials may be evaluated based on performance under non-standard reaction conditions. For example, due to specific reactants or impurities in a reagent or monomer source, polymerization efficiency may be adversely affected in the absence of a PM. Examples include the use of comonomer, especially 1-octene, prepared by gasification (reaction of an $H_2/H_2O$ mixture) with coal, peat, cellulose, or other carbon source and fractionation of the resulting mixture.

In all of the foregoing examples it is desirable to apply statistical evaluation tools to refine data generated by the individual polymerizations or other reactions. In this manner, unreliable or defective results can be eliminated and actual trends in the data more readily identified. Desirably, data meeting statistically significant requirements, especially data satisfying a 95 percent or greater confidence interval is used in the present invention. In addition, it is understood that optimum performance may be represented by a maximum or minimum value in a given property or result over a given interval (peaking profile) or alternatively, a steady, decreasing or increasing result over the range of variables tested.

Often, in order to evaluate multiple candidates under slightly different polymerization conditions it is necessary to calculate conversion values under standard reaction conditions based on a theoretical polymerization model or on a separate result or variable derivable from such data. Thus, the variable of interest may also be selected based on such theoretical or calculated results, or by a combination of multiple variables.

In addition to the polymerization modifier, conventional additives may also be employed in the reaction mixture to obtain one or more beneficial results. For example, a scavenger may be employed to remove detrimental impurities, if any, present in the reaction mixture. An example of a suitable scavenger is an alumoxane compound, employed in an amount that is insufficient to result in activation of the metal complex. Especially preferred alumoxanes include triisopropylaluminum modified methylalumoxane or triisobutylaluminum modified methylalumoxane available commercially under the trade designation MMAO-IP and MMAO-3A from Akzo Noble Corporation. Typically the molar quantity of such scavenger employed ranges from 1 to 10 moles based on metal (aluminum) value per mole of metal complex.

The Selection Process

A "library" as the term is used herein means a group of compounds having either chemical diversity or process diversity. Chemical diversity refers to a library having members that vary with respect to atoms or their arrangement in molecules or compounds. Process diversity refers to a library having members that are exposed to different processing conditions and may or may not possess different chemical properties as a result of the different process history. Different processing conditions include varying the ratios of compounds and reagents, time of reaction, reaction temperature, reaction pressure, rate of starting component addition to the reaction, residence time (or product removal rate), reaction atmosphere, mixing rate, or other conditions that those of skill in the art will recognize. It is through the creation of libraries having diversity and the screening of such libraries for a property or compound of interest that a complete combinatorial research and development program may be undertaken for olefin polymerization reactions.

An "array" refers to a spatial orientation of the members of one or more libraries to facilitate combination with other libraries or library members.

In particular, this invention provides the method and apparatus for the synthesis of libraries of transition metal complexes, cocatalyst therefor, and polymerization modifiers or arrays of any two or more of the foregoing, by a variety of routes for evaluation as catalyst compositions. Preferably, the invention relates to a technique for the identification of polymerization modifiers that optimize or improve one or more aspects of an olefin polymerization process or product. Additional components for the catalyst composition may be ordered as libraries or included as a constant or standardized reagent. Activation of these transition metal complexes into activated compositions by varied techniques may be included as well, particularly when the cocatalyst or activator is one of the variables to be studied or screened. After the transition metal complex, cocatalyst, and/or polymerization modifier libraries are prepared, the invention provides for forming arrays thereof and screening of one or more resulting properties. Screening may be in, for example, a series of individual polymerization reactors that provides detailed information about catalytic activity under a variety of reaction options and conditions, including monomer and comonomer choice, solvent, pressure, temperature, stirring rate, volume, stoichiometric relationships, and order of addition of chemicals. Thus, one may choose to "combinatorialize" any of the polymerization reaction conditions for single or multiple libraries or for an array. By this is meant that individual members of the various libraries are combined and optionally subjected to one or more process steps to ultimately form a catalyst composition which is tested for one or more olefin polymerization properties, polymer properties or other performance properties. Optional steps in this addition polymerization combinatorial process may include a primary screen prior to screening in the individual polymerization reactors. A primary screen may, for example, comprise an optical screen that simply determines which members of the catalyst library form a homogeneous solution. Another optional step is to further characterize the resultant polymers formed in the polymerization reactor. Such further screening may employ a rapid liquid chromatography and/or light scattering system, or determination of the chemical, physical or mechanical properties of the resultant polymers.

The members of a precursor library, procatalyst library, catalyst library, arrays formed therefrom, or a product library are typically stored or provided in a spatially addressable format, meaning that each compound or mixture is separated from the others, generally in a liquid form such as a solution or slurry, and retained in a sealed vial. Due to the corrosive nature of many of the components, reagents or solvents employed in forming the various libraries, the individual vials, all reaction vessels, and even the entire combinatorial apparatus are preferably retained under inert atmospheric conditions. All manipulations are performed under inert atmospheric or high vacuum conditions.

One option for the creation of the procatalyst library may include the generation of stock solutions of the transition metal complex, cocatalyst and/or polymerization modifier libraries, so that each member of the catalyst composition library is made of the same parent library members by means of different reactions or under different reaction conditions or by combination with different reactions and reaction conditions. In a preferred embodiment, the transition metal complex library, cocatalyst library, and polymerization modifier library are provided in a liquid form, for example with each compound stored in a separate vessel, preferably in dilute form or as a slurry (for example, where a solid catalyst support is included) in a liquid such as a hydrocarbon, halocarbon or halohydrocarbon. Preferably, the compounds or mixtures comprising the parent library are stored in vials having a septum or other sealing mechanism that can be penetrated by a needle that may be on a robotic arm of known liquid handling robots or they are produced by combination of such components prior to or at the same time as the polymerization of interest.

Various catalyst compositions may be formed from combinations of the other libraries or standards to thereby form an array. In a preferred embodiment, at least one member from the catalyst precursor library is combined with at least one cocatalyst and one polymerization modifier. Alternatively, a statistical approach may be used to randomize the various components to be tested, optionally including repetition of one or more array members for purposes of determining random or non-random variation. Highly desirably the libraries are combined and reaction conditions varied so as to form at least 8, preferably at least 24, more preferably at least 32, and most preferably at least 48 catalyst library members or polymerization process members of the resulting array.

In some embodiments, the various compounds, especially the PM components, may be combined without determination of the product of such combination, or if, in fact, a product forms at all. The metal complex, cocatalyst, and polymerization modifier may be added to the reaction vessel at the same time or sequentially. They may be added before, along with or subsequent to addition of any additional reactants or the monomers used in the reaction of interest. Alternatively, some or all of the compounds may be prereacted or combined and recovered or purified prior to use in a subsequent process. In all of the foregoing processes, the result of any single or multiple combination need not be determined.

The product library (catalyst composition or polymer) may have different members resulting from combinatorializing the process variables in the reaction of interest. Process variables that may be combinatorialized include the types, amounts, and ratios of starting components, time for reaction, reaction temperature, reaction pressure, rate and/or method of starting component addition to the reaction (or reactor), residence time (that is the rate and/or method of product removal from the reaction or reactor), reaction stir rate and/or method, reaction kill rate and/or method, reaction atmosphere, and other conditions that those of skill in the art will recognize.

Those of skill in the art will appreciate the vast number of different possible combinations of precursors, modifiers, activators, or other starting components that may be combined together to form the catalyst composition libraries. In addition, this combination methodology may be combined with combinations of various reaction conditions, including different starting component ratios, different temperatures, solvents, pressures, mixing rates, times, order of addition of chemicals or atmospheres to form extensive product libraries.

In the methodology of this invention, a library is screened for a property or compound of interest. The screening takes place as the reaction of interest is being performed, that is, in real time or subsequent to the reaction. As used herein, "screening" refers to testing a library for a desired property by measurement of one or more product or process variables, preferably one or more process variables under addition polymerization conditions. A screen of one or more process variables may be combined with the evaluation of product properties of interest, if desired. For example, polymerization reactions performed in a polymerization reactor, especially a solution polymerization reactor, can be evaluated by monomer consumption, temperature evolution, and/or pressure-, viscosity-, particle size-, or color-change, and these results individually or collectively correlated with one or more polymer properties. Examples of suitable polymer properties that may be so correlated with the on-line process data include molecular weight, molecular weight distribution, comonomer content, crystalline melting point, melt index, flow index, or other melt flow properties, tacticity, solubility, density, and so forth.

Each of the various libraries may be stored in a liquid or solid state and retrieved from storage for combining, daughtering, running in the reaction of interest, screening, or combinations thereof. Libraries are preferably stored in a storage rack that holds the libraries separately from each other. Libraries may be retrieved from storage either manually or automatically, using known automated robots. Specific robots useful for retrieving such stored libraries include systems such as those marketed by Aurora Biosciences or other known robotic vendors. If the libraries are stored in the solid phase, the members typically require dissolution or slurrying, which may be performed at a dissolution or slurrying station, or if sufficient volume is provided for library storage, in the vessel or chamber holding the sample. A dilution station is a location where the library members are dissolved in a suitable solvent or where more concentrated solutions of the library members are diluted before use in either the reaction of interest or in a screen.

Each transition metal complex, cocatalyst, polymerization modifier, or catalyst composition libraries may be converted into one or more daughter libraries through formation of arrays. A daughter library is created from the parent library by taking one or more aliquots from one or more members in the parent library, and optionally treated to differing conditions than the parent library or otherwise converted, to form a second library. A limited number of members of the parent library may be daughtered in this manner, or all the members may be daughtered at least once to create a daughter library. Thus, a daughter library may be smaller, the same size as, or larger than the parent library in terms of both the number of members and the sample size. Daughtering is performed in order to provide multiple libraries for multiple reactions of interest or multiple screens without having to recreate the parent library.

As used herein a "station" is a location in the apparatus that performs one or more functions to the members of a library. The functions may be combining the starting components, creating a product library via a reaction, screening, purifying, separating, or performing any of the other functions discussed above. Thus, the station may comprise a liquid handling robot with pumps and computers (as known in the art) to dispense, dissolve, mix and/or move liquids from one container to another.

The station may comprise any of the reactors discussed above, and may be remotely located from the remainder of the apparatus, such as in an inert atmosphere glove box, if desired. A station may also perform multiple functions, optionally separated by cleaning, reconditioning or resetting of the equipment, if desired.

Optionally a filtering station is provided. The filtering station is useful to separate solid phase agents or products from liquid products or compositions. For example, if solid-phase by-products form, such a station will allow for separation of any liquid phase components in a filtering step. Alternatively, if soluble reaction products are desired for further use herein, filtration may be employed to remove undesired by-products. Desirably, the filtering station can be used multiple times by restoring original process conditions after each filtration.

A filtering station provides for ease in the synthesis of the metal complex, cocatalyst and polymerization modifier libraries. The various components of the catalyst composition may be provided in the solid or liquid phase in a single reactor, while various reagents, solvents and polymerization modifiers are combined and excess reagents or by-products removed. This technique generally allows for the use of an excess of any reagent or solvent, ease of purification or work-up, and automation of the process.

Suitable techniques for screening useful herein include infrared (IR) thermography or Fourier Transform Infrared (FTIR) spectroscopy or visible light or other optical viewing as disclosed in WO 98/15815 or WO 98/15805. Using an optical technique typically entails inserting the starting materials (that is the catalyst composition library member with reactants and/or monomer) in an array format into a chamber (for example, a vacuum chamber or a chamber pressurized with reactant monomer or a chamber pressurized with an inert gas). The reaction of interest is performed in parallel in the chamber using a plate having multiple wells for the catalyst members or starting materials for the product members (such as a microtiter plate, for example) or individually. The chamber has a window that is invisible to the optical camera (for example by use of a calcium fluoride or sapphire crystal for an IR camera). As the reaction of interest is carried out, the reaction is monitored. For example, an IR camera or thermocouple may record heat released by the reaction. A preferred method for monitoring a process condition is to measure consumption of one or more monomers, typically by measuring flow or pressure loss of one or more monomers in an otherwise sealed reactor or the pressure decrease with time within a sealed reactor operating under polymerization conditions.

Because of the wide applicability of this invention to a broad variety of polymerization conditions, a combinatorial approach can be used to identify optimum catalyst compositions for use in different addition polymerization reactions. An advantage to the present combinatorial approach is that the choice of metal complex, cocatalyst, and polymerization modifier can be tailored to specific polymerization conditions.

The scale of the polymerizations employed in the present screening operations preferably employs transition metal complexes, cocatalysts and polymerization modifiers in an amount from 0.01 µg to 1.0 g, more preferably between one 0.1 µg to 0.1 g, although the scale can be modified as desired depending on the equipment used. Those of skill in the art can readily determine appropriate sets of reactions and reaction conditions (including addition of one or more impurities) to generate and/or evaluate the libraries of interest.

The members of the various libraries can be laid out in a logical or a random fashion in multi-tube arrays or multi-well plates, preferably in the form an array. Preferably, the liquids are dilute solutions or slurries of the compound or mixture of interest. In a preferred embodiment, an A×B array is prepared, with various combinations of metal complex, cocatalyst and polymerization modifier of interest. However, it is also possible to evaluate a single transition metal complex or cocatalyst with a plurality of polymerization modifiers, monomers, impurities, or other additives, optionally at different polymerization temperatures, concentrations, pressures, monomers, or other reaction conditions, and then repeat the process as desired with a plurality of different subject compounds.

The performance of the particular combination of library member, reagent, or process condition under the reaction conditions of interest is measured and correlated to the specific combination tested. Adjustments to the data to compensate for non-standard conditions, systematic variation, or other variables can be applied. In addition, statistical analyses may be performed to manipulate the raw data and determine the presence of data variation. The array can be ordered in such a fashion as to expedite synthesis and/or evaluation, to maximize the informational content obtained from the testing, or to facilitate the rapid evaluation of such data, if desired. Methods for organizing libraries of compounds are well known to those of skill in the art, and are described, for example, in U.S. Pat. No. 5,712,171. Such methods can be readily adapted for use with the compounds and process parameters described herein.

By screening multiple synthetic variations of a transition metal complex, cocatalyst, polymerization modifier, or resulting catalyst composition, the selection of the optimal candidate may be rapidly determined. The desired physical and chemical properties for the various library- or daughter library-members can be rapidly optimized, and directly correlated with the chemical or physical changes within a particular array or sub-array.

The polymerizations using the various members in the libraries generally involve contacting appropriate mixtures thereof under polymerization conditions in the tubes or wells in a multi-tube rack or multi-well plate, on a titer plate, or in a matrix of an inert support material, and allowing the addition polymerization reaction to take place while monitoring one or more process variables, especially heat evolution or monomer consumption. Because of the ease and accuracy of monitoring gaseous flow, ethylene consumption in the polymerization of interest, optionally correlated with heat evolution, is the most desired process variable for screening herein. Secondary screening of polymer properties, especially tacticity, molecular weight, or comonomer composition are further optionally correlated with the process data according to the present invention.

Robotic arms and multi-pipet devices are commonly used to add appropriate reagents to the appropriate polymerization reactors, such as the tubes in multi-tube racks, or wells in multi-well plates. Alternatively, but less desirably, a common polymerization reactor can be employed sequentially to conduct the subject polymerizations. The tubes are desirably covered with a rubber septum or similar cover to avoid contamination, and the reagents added via injection through a needle inserted through the cover. Suitable process equipment for the foregoing operations has been previously disclosed in U.S. Pat. No. 6,030,917, U.S. Pat. No. 6,248,540 and EP-A-978,499.

In one embodiment, the polymerizations are carried out via computer control. The identity of each of the compounds of the library can be stored in a computer in a "memory map" or other means for correlating the data regarding the polymerizations. Alternatively, the chemistry can be performed manually, preferably in multi-tube racks or multi-well plates, and the resulting information stored, for example on a computer, if desired.

Any type of multi-well plate or multi-tube array commonly used in combinatorial chemistry can be used. Preferably, the number of wells or tubes is in excess of 30, and there is a tube in at least 60 percent of the positions in each multi-tube array. The shape of the rack is not important, but preferably, the rack is square or rectangular. The tubes can be made, for example, from plastic, glass, or an inert metal such as stainless steel. Because of the relatively high temperatures employed in the polymerization screens, desirably in excess of 100° C. more preferably in excess of 110° C., preferably glass- or metal-, and most preferably stainless steel-, reactors are employed.

Any type of liquid handler that can add reagents to, or remove reagents from, the wells and/or tubes of the array can be used. Many such handlers involve the use of robotic arms and robotic devices. Suitable devices are well known to those of skill in the art of combinatorial chemistry. The individual cells are also desirably equipped with or accessible by a filter means through which liquid reagents, products or by-products can be removed, leaving solid products or reagents in the cell. Isolation of polymer products can be accomplished using commercially available centrifugal devolatilizers or evaporators, and needn't be part of the automated procedures of the process.

Any device that can take samples from the polymerization reactor(s) and analyze the contents can be used for product screening. Examples include chromatographic devices, such as an analytical or preparative scale high performance liquid chromatography (HPLC), GC or column chromatography. For analysis of polymer properties simple solution viscosity, melt viscosity, $^1$H NMR, $^{13}$C NMR, FTIR, xylene solubility (XS) studies, or other common analytical techniques may be employed for determination of polymer properties.

Preferably, in those embodiments in which a chromatographic column (HPLC, GC or column chromatography) is used, the device has the ability to identify when the compound of interest is eluting from the column. Various means have commonly been used to identify when compounds of interest are eluting from a column, including ultraviolet (UV), infrared (IR), thin layer chromatography (TLC), gas chromatography-mass spectrometry (GC-MS), flame ionization detector (FID), nuclear magnetic resonance (NMR), and evaporative light scattering detector (ELSD). Any of these means, and others known to those of skill in the art, can be used, alone or in combination.

The invention preferably includes a computer system capable of storing information regarding the identity of the compounds and mixtures in the libraries and the product streams obtained from the polymerizations. Software for managing the data is stored on the computer. Relational database software can be used to correlate the identity of the compounds employed in each polymerization and the results. Numerous commercially available relational database software programs for this purpose are available and known to the skilled artisan. Although relational database software is a preferred type of software for managing the data obtained during the processes described herein, any software that is able to create a "memory map" of the test compounds and correlate that information with the information obtained from the polymerizations can be used.

The present invention is beneficially employed with respect to the polymerization of one or more addition polymerizable monomers. Preferred addition polymerizable monomers include ethylenically unsaturated monomers, acetylenic compounds, conjugated or non-conjugated dienes, and polyenes. Preferred monomers include olefins, particularly α-olefins having from 2 to 20,000, preferably from 2 to 20, more preferably from 2 to 8 carbon atoms, combinations of two or more of such alpha-olefins, and combinations of one or more such α-olefins with one or more diolefins. Particularly suitable α-olefins include, ethylene, propylene, 1-butene, 1-pentene, 4-methyl-1-pentene, 1-hexene, 1-heptene, 1-octene, 1-nonene, 1-decene, 1-undecene, 1-dodecene, 1-tridecene, 1-tetradecene, 1-pentadecene, and combinations thereof. Other preferred addition polymerizable monomers include styrene, halo- or alkyl substituted styrenes, tetrafluoroethylene, vinylcyclobutene, 1,4-hexadiene, dicyclopentadiene, ethylidene norbornene, and 1,7-octadiene.

The following specific embodiments of the invention are especially desirable and hereby delineated in order to provide specific disclosure for the appended claims:

1. A method for identifying a catalyst composition for use in the homogeneous addition polymerization of one or more addition polymerizable monomers, said catalyst composition comprising a catalyst precursor compound of a metal of Groups 3-11 of the Periodic Table of the Elements, a cocatalyst and a polymerization modifier capable of improving one or more polymer or process properties, said method comprising:

A) providing at least one library comprising a plurality of catalyst precursor compounds i) comprising a metal of Groups 3-11 of the Periodic Table of the Elements; at least one cocatalyst ii) capable of converting a catalyst precursor compound into an active polymerization catalyst; and at least one compound iii) to be evaluated as a polymerization modifier;

B) sequentially converting a multiplicity of the catalyst precursor compounds i) into compositions to be tested for polymerization properties by reaction thereof with one or more cocatalysts ii) and one or more polymerization modifiers iii);

C) contacting the resulting composition of step B) or a portion thereof with one or more addition polymerizable monomers under olefin addition polymerization conditions in a polymerization reactor, D) measuring at least one process or product variable of interest, and E) selecting the catalyst composition of interest by reference to said at least one process or product variable;

characterized in that the polymerization modifier iii) is prepared prior to use by reaction between two or more starting reagents.

2. A method for identifying a catalyst composition for use in the homogeneous addition polymerization of one or more addition polymerizable monomers, said catalyst composition comprising a catalyst precursor compound of a metal of Groups 3-11 of the Periodic Table of the Elements, a cocatalyst and a polymerization modifier capable of improving one or more polymer or process properties, said method comprising:

A) providing at least one catalyst precursor compound i) comprising a metal of Groups 3-11 of the Periodic Table of the Elements; at least one library comprising a plurality of candidate cocatalysts ii) to be evaluated for converting catalyst precursor compound i) into an active polymerization catalyst; and at least one compound iii) to be evaluated as a polymerization modifier;

B) sequentially utilizing a multiplicity of the cocatalyst compounds II) to prepare compositions to be tested for polymerization properties by reaction thereof with one or more catalysts i) and one or more polymerization modifiers iii);

C) contacting the resulting composition or a portion thereof with one or more addition polymerizable monomers under olefin addition polymerization conditions in a polymerization reactor, D) measuring at least one process or product variable of interest, and E) selecting the catalyst composition of interest by reference to said at least one process or product variable;

characterized in that the polymerization modifier iii) is prepared prior to use by reaction between two or more starting reagents.

3. A method for identifying a catalyst composition for use in the homogeneous addition polymerization of one or more addition polymerizable monomers, said catalyst composition comprising a catalyst precursor compound of a metal of Groups 3-11 of the Periodic Table of the Elements, a cocatalyst and a polymerization modifier capable of improving one or more polymer or process properties, said method comprising:

A) providing at least one catalyst precursor compound i) comprising a metal of Groups 3-11 of the Periodic Table of the Elements; at least one cocatalyst ii) capable of converting catalyst precursor compound i) into an active polymerization catalyst; and at least one library comprising a plurality of candidate compounds iii) to be evaluated as polymerization modifiers;

B) sequentially utilizing a multiplicity of the candidate polymerization modifier compounds iii) to prepare compositions to be tested for polymerization properties by reaction thereof with one or more catalysts i) and one or more cocatalysts ii);

C) contacting the resulting composition or a portion thereof with one or more addition polymerizable monomers under olefin addition polymerization conditions in a polymerization reactor, D) measuring at least one process or product variable of interest, and E) selecting the catalyst composition of interest by reference to said at least one process or product variable;

characterized in that the polymerization modifiers iii) are prepared prior to use by reaction between two or more starting reagents.

4. The method of any one of embodiments 1-3, wherein the polymerization modifier is prepared by reaction of one or more metal compounds of the formula: $[M^4A^1{}_{x'}G_{y'}]_{z'}$, wherein:

$M^4$ is a metal of Groups 2-13, Ge, Sn, or Bi;

$A^1$ is independently an anionic or polyanionic ligand;

x' is a number greater than zero and less than or equal to 6;

G is a neutral Lewis base, optionally bound to $A^1$;

y' is a number from 0-4;

z' is a number from 1 to 10;

with one or more compounds of the formula: $[(H-J^1)_{z''}A^2]_{z'''}$, wherein:

$J^1$ is $NA^3$, $PA^3$, S, or O, z'' is 1 or 2, $A^2$ is $C_{1-20}$ hydrocarbyl or inertly substituted hydrocarbyl, or a polyvalent derivative thereof, $A^3$ is hydrogen, $C_{1-20}$ hydrocarbyl or inertly substituted hydrocarbyl, or a covalent bond (when $A^2$ is a divalent ligand group and z'' is one); and z''' is a number from 1 to 10.

5. The method of embodiment 4 wherein the polymerization modifier is prepared in solution and used without isolation or purification.

6. The method of embodiment 5 wherein the polymerization modifier is prepared by contacting hydrocarbon solutions of the starting reagents.

7. The method of embodiment 6 wherein step C) comprises combining the polymerization modifier solution, monomer(s), Group 3-11 metal complex, and cocatalyst in any order or by forming any subcombination thereof.

8. The method of embodiment 4, wherein the cocatalyst comprises an alumoxane, a tri(fluoroaryl)borane, or an ammonium salt of a tetra(fluorophenyl)borate.

9. The method of embodiment 8, wherein ethylene, propylene, a combination of ethylene and propylene, or a combination of any of the foregoing with 1-butene, 4-methyl-1-pentene, 1-hexene, 1-octene, styrene, or ethylidenenorbornene is copolymerized.

10. The method of embodiment 9 wherein the catalyst comprises (1H-cyclopenta[l]phenanthrene-2-yl)dimethyl(t-butylamido)silanetitanium dimethyl, the cocatalyst comprises a trialkylammonium salt of tetrakis(pentafluorophenyl)borate, and a mixture of ethylene and styrene is copolymerized.

11. The method of embodiment 8, wherein the cocatalyst comprises a mixture of methyldi($C_{14-18}$ alkyl)ammonium tetrakis(pentafluorophenyl)borate salts.

12. The method of embodiment 4, wherein the catalyst composition of interest is selected by reference to at least two variables selected from process variables and product variables.

13. The method of embodiment 12, wherein the process variables are high catalyst efficiency, monomer consumption, improved catalyst efficiency at elevated polymerization temperature, and steady or increasing productivity with increasing molar ratio of polymerization modifier to transition metal compound; and the product variable is reduced formation of high crystalline polymer fraction, or increased comonomer incorporation in a copolymer of ethylene and at least one copolymerizable comonomer.

14. The method of embodiment 4, wherein all of the process steps are conducted in the same reactor vessel by means of computer controlled, robotic processing and the screening results are stored in at least one memory device.

15. The method of embodiment 14, wherein the library is used to form the A axis of an A×B array and a second selection of compositions or process conditions is used to form the B axis of said A×B array and relational database software is used to select the property of interest from among the set of binary pairs of said A×B array.

16. The method of embodiment 4 wherein the process variable that is measured is the quantity of at least one monomer consumed during the polymerization.

17. The method of embodiment 1 wherein in step d) the property of interest is calculated conversion after 300 seconds based on the following polymerization model:

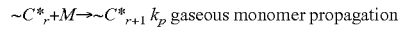

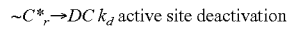

where:
~C*$_r$ is a growing chain with chain length r
M is the monomer
DC is dead polymer chain
$k_p$ is the gaseous monomer propagation rate constant, and
$k_d$ is the active site deactivation rate constant;
calculated as total gaseous monomer uptake versus time (t in seconds) according to the following equation:

$$\text{uptake} = \frac{k_p \cdot [M]_{liquid}[C]_0[1 - \exp(-k_d \cdot t)]}{k_d} \quad \text{Eq 1}$$

as determined according to the Levenberg-Marquart non-linear regression method, where
$[M]_{liquid}$ is the gaseous monomer concentration in the liquid phase, and
$[C]_0$ is the initial concentration of the catalyst at t=0.

18. The method of embodiment 17 wherein the 300 second monomer uptake is greater than the corresponding value using triisobutylaluminum modified methylalumoxane (MMAO) instead of the polymerization modifier at an MMAO:Ti molar ratio of 5:1.

19. A process for the polymerization of an olefin by contacting a polymerizable mixture comprising at least one olefin monomer and styrene under polymerization conditions with a catalyst composition comprising a transition metal complex, a cocatalyst and a polymerization modifier, characterized in that the polymerization modifier is selected from the group consisting of ethylaluminum bis(N,N-diphenylamide) and di(2,7-dimethyl-6-octene-1-yl)aluminum N,N-diphenylamide.

20. A process according to embodiment 19 wherein the metal complex is a Group 4 metal complex and the cocatalyst is a Lewis acid or a trihydrocarbylammonium salt of a non-coordinating compatible anion.

21. A process for the copolymerization of ethylene and styrene to form a pseudo-random copolymer by contacting a mixture comprising ethylene and styrene under polymerization conditions with a catalyst composition comprising a metal complex, a cocatalyst and a polymerization modifier, characterized in that, the metal complex comprises (1H-cyclopenta[l]phenanthrene-2-yl)dimethyl(t-butylamido)silanetitanium dimethyl;
the cocatalyst comprises tris(pentafluorophenyl)boron or a trialkylammonium salt of tetrakis(pentafluorophenyl)borate; and
the polymerization modifier is selected from the group consisting of ethylaluminum bis(N,N-diphenylamide) and di(2,7-dimethyl-6-octene-1-yl)aluminum N,N-diphenylamide.

22. A process for the copolymerization of ethylene and 1-octene to form a copolymer by contacting a mixture comprising ethylene and 1-octene under polymerization conditions with a catalyst composition comprising a metal complex, a cocatalyst and a polymerization modifier, characterized in that,
the metal complex comprises a 3-amino-substituted inden-1-yl complex of titanium;
the cocatalyst comprises tris(pentafluorophenyl)boron or a trialkylammonium salt of tetrakis(pentafluorophenyl)borate; and
the polymerization modifier comprises a compound selected from the group consisting of:
the 1:1 molar reaction product of t-butanol with trioctylaluminum; the 1:1 molar reaction products of 2,6-diphenylphenol, 2,6-di(t-butyl)-4-methylphenol, phenol, and t-butyldi(methyl)hydroxysilane with triisobutylaluminum; the 2:1 molar reaction products of di(n-pentyl)amine with triisobutylaluminum; the 2:1 molar reaction product of 2,6-diphenylphenol, and t-butyldi(methyl)hydroxysilane with triethylaluminum; the 1:1 molar reaction products of 2,6-diphenylphenol, 2,6-di(t-butyl)-4-methylphenol, phenol, t-butanol, 1-dodecanol, t-butyldi(methyl)hydroxysilane, and p-methoxyphenol with trioctylaluminum; and the 2:1 molar reaction products of 2,6-diphenylphenol, 2,6-di(t-butyl)-4-methylphenol and t-butyldi(methyl)hydroxysilane with tri(octyl)aluminum.

23. The process of embodiment 22 wherein the metal complex comprises (N-1,1-dimethylethyl)-1,1-dimethyl-1-((1,2,3,3a,7a-η)-3-(tetrahydro-1H-pyrrol-1-yl)-1H-inden-1-yl)silanaminato-(2-)-N—)-titanium (II) 1,3-pentadiene or (N-1,1-dimethylethyl)-1,1-(4-n-butylphenyl)-1-((1,2,3,3a,7a-η)-3-(1,3-dihydro-2H-isoindol-2-yl)-1H-inden-1-yl) silanaminato-(2-)-N—)-dimethyltitanium and the polymerization modifier comprises (t-butyldimethylsiloxy) diisobutylaluminum or bis(t-butyldimethylsiloxy)octylaluminum.

24. A process for the copolymerization of ethylene and 1-octene to form a copolymer by contacting a mixture comprising ethylene and 1-octene under polymerization conditions with a catalyst composition comprising a metal complex, a cocatalyst and a polymerization modifier, characterized in that,
the metal complex comprises an s-indacenyl silanaminato complex of titanium;
the cocatalyst comprises tris(pentafluorophenyl)boron or a trialkylammonium salt of tetrakis(pentafluorophenyl)borate; and
the polymerization modifier comprises a compound selected from the group consisting of the 1:1 molar reaction products of phenylnaphthylamine, triethylhydroxysilane, n-butanol, or benzoic acid with triisobutylaluminum; 2,6-diphenylphenol, 4-methyl-2,6-di(t-butyl)phenol, triethylhydroxysilane, n-butanol or 2-hydroxymethylfuran with trioctylaluminum; and phenol or 2-(hydroxymethyl)pyridine with dibutylmagnesium.

25. The process of embodiment 24 wherein the metal complex comprises [N-(1,1-dimethylethyl)-1,1-dimethyl-[1,2,3 3a,8a-η)-1,5,6,7-tetrahydro-2-methyl-s-indacen-1-yl]silanaminto(2-)-N]titanium (II) 1,3-pentadiene and the polymerization modifier comprises (phenyl(naphthyl)amino) diisobutylaluminum, (triethylsiloxy)diisobutylaluminum, (n-butoxy)-diisobutylaluminum, diisobutylaluminum benzoate; 2,6-diphenylphenoxy(dioctyl)aluminum, 4-methyl-2, 6-dit-butylphenoxy)dioctylaluminum, (triethylsiloxy)dioctylaluminum, (n-butoxy)-dioctylaluminum, (2-furanylmethoxy)dioctylaluminum; phenoxy-n-butylmagnesium, or (2-pyridinylmethoxy)-n-butylmagnesium.

26. A process for the copolymerization of ethylene and propylene to form a copolymer by contacting a mixture comprising ethylene and propylene under polymerization conditions with a catalyst composition comprising a metal complex, a cocatalyst, and a polymerization modifier, characterized in that,
the metal complex comprises a complex of hafnium and a pyridylamine;
the cocatalyst comprises tris(pentafluorophenyl)boron or a trialkylammonium salt of tetrakis(pentafluorophenyl)borate; and
the polymerization modifier comprises the reaction product of a tri($C_{2-20}$alkyl)aluminum with bis(trimethylsilyl)

amine, 1-octanol, 1-dodecanol, phenol, 4-methyl-2,6-di(t-butyl)phenol, or t-butyldimethylsiloxane.

27. The process of embodiment 26 wherein the metal complex comprises 2-[N-(2,6-diisopropylphenylamido)-o-isopropylphenylmethyl]-6-(2-η-1-naphthyl)-pyridyl hafnium (IV) dimethyl, the cocatalyst comprises a mixture of methyldi($C_{14-18}$) long chain alkyl ammonium tetrakis(pentafluorophenyl)borate salts, and the polymerization modifier comprises (dodecyloxy)dioctylaluminum, (bis(trimethylsilyl)amino)dioctylaluminum, phenoxydioctylaluminum, (4-methyl-2,6-di(t-butyl)phenoxy)dioctylaluminum, (t-butyldimethylsiloxy)dioctylaluminum, bis(trimethylsilyl)aminodiethylaluminum, or bis(t-butyldimethylsiloxy)isopropylaluminum.

EXAMPLES

It is understood that the present invention is operable in the absence of any component which has not been specifically disclosed. The following examples are provided in order to further illustrate the invention and are not to be construed as limiting. Unless stated to the contrary, all parts and percentages are expressed on a weight basis. The term "overnight", if used, refers to a time of approximately 16-18 hours, "room temperature", if used, refers to a temperature of about 20-25° C., and "mixed alkanes" refers to a mixture of hydrogenated propylene oligomers, mostly $C_6$-$C_{12}$ isoalkanes, available commercially under the trademark Isopar E™ from Exxon-Mobil Chemicals, Inc.

Catalyst Composition Library Preparation:

A library of compounds for testing as polymerization modifiers is prepared by robotic synthesis using a Chemspeed™ synthesizer, model ASW 2000 (available from Chemspeed, Inc.) equipped with 16×13 mL reactor sets. Typically, five sets of 16×13 mL reactors with reflux condensers, for a total of 80 reactors, are installed on the robotics deck. The reagents for each library are prepared in the drybox and transferred to the robotics deck. The vials used in the preparation and containment of these reagents are dried in an oven at 150° C. for at least 4 hours prior to use. All reactions are performed under inert atmosphere.

Using software control, the reactors are heated to 110° C. for at least four hours while under vacuum, followed by 60 minutes at 110° C. while under an argon purge to dry the reactors. The reactors are then cooled to ambient temperature. The cannula and sample loops are primed with dry nitrogen, and then the sample loop is passivated by aspirating the volume of the sample loop (usually 10000 or 25000 uL) with 1 M $AlEt_3$ in toluene. This solution is then disposed of at the rinse station and the cannula and sample loop are rinsed with fresh toluene. Using the liquid handler, the 80 reactors are then charged with the first reagent (trialkylaluminum) solutions. The vortexer is started (800 rpm) and the jacket temperature of the reactors is set at 25° C. with the reflux condensers set to 5° C. The second reagent solutions (amines or alcohols) are then charged to the reactors at an addition rate of 5 mL/min. After all of the additions are completed, the reactors are closed under argon and heated to 100° C. for five hours, then cooled to 50° C. before vortexing is stopped.

The reagent tray is then changed to accommodate 20 mL sample vials. Using the liquid handler, the contents of each reactor are transferred to a serum capped 20 mL vial. The sample is then diluted to give an approximately 0.1 M solution of the desired polymerization modifier. After transferring the products, the sample is capped under the nitrogen atmosphere of the synthesizer purge box, and then transferred to a drybox for storage prior to use.

Either one or two equivalents of second reagent (B) are reacted with the first reagent (A) in a hydrocarbon diluent, typically hexane or heptane, to generate a library of compounds for further screening. The reagents are initially contacted at 20-25° C. followed by heating at reflux for several hours. The pairs of reagents tested are identified in Table 1. The products are the corresponding stoichiometric reaction products, excepting for $(B3)_3A2_2$ (a product with 3 B groups to 2 A groups) which resulted upon combining two equivalents of B3 with one equivalent of A2.

TABLE 1

| A1 | A2 Al(Et)$_3$ | A3 Al(Me)$_3$ | A4 | A5 |
|---|---|---|---|---|
| 1:1  2:1 | 1:1  2:1 | 1:1  2:1 | 1:1  2:1 | 1:1  2:1 |
| B1A1  B1$_2$A1 | B1A2  B1$_2$A2 | B1A3  B1$_2$A3 | B1A4  B1$_2$A4 | B1A5  B1$_2$A5 |

B1

TABLE 1-continued

| | A1 | | Al(Et)$_3$ A2 | | Al(Me)$_3$ A3 | | A4 | | A5 | |
|---|---|---|---|---|---|---|---|---|---|---|
| | 1:1 | 2:1 | 1:1 | 2:1 | 1:1 | 2:1 | 1:1 | 2:1 | 1:1 | 2:1 |
| B2 (2,6-di-tBu-phenol) | B2A1 | B2$_2$A1 | B2A2 | B2$_2$A2 | B2A3 | B2$_2$A3 | B2A4 | B2$_2$A4 | B2A5 | B2$_2$A5 |
| Ph$_2$NH, B3 | B3A1 | B3$_2$A1 | B3A2 | B3$_2$A2$_2$ | B3A3 | B3$_2$A3 | B3A4 | B3$_2$A4 | B3A5 | B3$_2$A5 |
| piperidine B4 | B4A1 | B4$_2$A1 | B4A2 | B4$_2$A2 | B4A3 | B4$_2$A3 | B4A4 | B4$_2$A4 | B4A5 | B4$_2$A5 |
| 2-methylindoline B5 | B5A1 | B5$_2$A1 | B5A2 | B5$_2$A2 | B5A3 | B5$_2$A3 | B5A4 | B5$_2$A4 | B5A5 | B5$_2$A5 |
| (benzyl)$_2$NH B6 | B6A1 | B6$_2$A1 | B6A2 | B6$_2$A2 | B6A3 | B6$_2$A3 | B6A4 | B6$_2$A4 | B6A5 | B6$_2$A5 |
| (i-Pr)$_2$NH B7 | B7A1 | B7$_2$A1 | B7A2 | B7$_2$A2 | B7A3 | B7$_2$A3 | B7A4 | B7$_2$A4 | B7A5 | B7$_2$A5 |
| B8 (N,N'-dimethylethylenediamine) | B8A1 | B8$_2$A1 | B8A2 | B8$_2$A2 | B8A3 | B8$_2$A3 | B8A4 | B8$_2$A4 | B8A5 | B8$_2$A5 |
| (Me$_3$Si)$_2$NH B9 | B9A1 | B9$_2$A1 | B9A2 | B9$_2$A2 | B9A3 | B9$_2$A3 | B9A4 | B9$_2$A4 | B9A5 | B9$_2$A5 |
| Ph-OH, B10 | B10A1 | B10$_2$A1 | B10A2 | B10$_2$A2 | B10A3 | B10$_2$A3 | B10A4 | B10$_2$A4 | B10A5 | B10$_2$A5 |
| t-Bu-OH, B11 | B11A1 | B11$_2$A1 | B11A2 | B11$_2$A2 | B11A3 | B11$_2$A3 | B11A4 | B11$_2$A4 | B11A5 | B11$_2$A5 |
| pyrrolidine B12 | B12A1 | B12$_2$A1 | B12A2 | B12$_2$A2 | B12A3 | B12$_2$A3 | B12A4 | B12$_2$A4 | B12A5 | B12$_2$A5 |
| 1-dodecanol B13 | B13A1 | B13$_2$A1 | B13A2 | B13$_2$A2 | B13A3 | B13$_2$A3 | B13A4 | B13$_2$A4 | B13A5 | B13$_2$A5 |
| 1-octadecanol B14 | B14A1 | B14$_2$A1 | B14A2 | B14$_2$A2 | B14A3 | B14$_2$A3 | B14A4 | B14$_2$A4 | B14A5 | B14$_2$A5 |
| (t-Bu)(Me)$_2$SiOH B15 | B15A1 | B15$_2$A1 | B15A2 | B15$_2$A2 | B15A3 | B15$_2$A3 | B15A4 | B15$_2$A4 | B15A5 | B15$_2$A5 |
| HN(n-C$_5$H$_{11}$)$_2$ B16 | B16A1 | B16$_2$A1 | B16A2 | B16$_2$A2 | B16A3 | B16$_2$A3 | B16A4 | B16$_2$A4 | B16A5 | B16$_2$A5 |
| 4-methoxyphenol B17 | B17A1 | B17$_2$A1 | B17A2 | B17$_2$A2 | B17A3 | B17$_2$A3 | B17A4 | B17$_2$A4 | B17A5 | B17$_2$A5 |

TABLE 1-continued

| | A1 | | Al(Et)₃ A2 | | Al(Me)₃ A3 | | A4 | | A5 | |
|---|---|---|---|---|---|---|---|---|---|---|
| | 1:1 | 2:1 | 1:1 | 2:1 | 1:1 | 2:1 | 1:1 | 2:1 | 1:1 | 2:1 |
| B18 | B18A1 | B18₂A1 | B18A2 | B18₂A2 | B18A3 | B18₂A3 | B18A4 | B18₂A4 | B18A5 | B18₂A5 |
| B19 | B19A1 | B19₂A1 | B19A2 | B19₂A2 | B19A3 | B19₂A3 | B19A4 | B19₂A4 | B19A5 | B19₂A5 |
| B20 | B20A1 | B20₂A1 | B20A2 | B20₂A2 | B20A3 | B20₂A3 | B20A4 | B20₂A4 | B20A5 | B20₂A5 |
| B21 | B21A1 | B21₂A1 | B21A2 | B21₂A2 | B21A3 | B21₂A3 | B21A4 | B21₂A4 | B21A5 | B21₂A5 |
| B22 | B22A1 | B22₂A1 | B22A2 | B22₂A2 | B22A3 | B22₂A3 | B22A4 | B22₂A4 | B22A5 | B22₂A5 |
| B23 | B23A1 | B23₂A1 | B23A2 | B23₂A2 | B23A3 | B23₂A3 | B23A4 | B23₂A4 | B23A5 | B23₂A5 |

Example 1

Evaluation of the foregoing compositions in the polymerization of mixtures of ethylene and styrene is conducted in a 48 cell parallel pressure reactor (PPR) equipped with rapid gel permeation chromatography (HTGPC) for polymer molecular weight determination. Each cell is fitted with a 16 mL glass insert for conducting the polymerization. The metal complex employed in the catalyst composition is (1H-cyclopenta[l]phenanthrene-2-yl)dimethyl(t-butylamido)silane-titanium dimethyl (C1), prepared according to the teachings of U.S. Pat. No. 6,150,297 (100 nmole). The structure of C1 is disclosed in FIG. 1. The cocatalyst is a mixture of methyldi($C_{14-18}$) long chain alkyl ammonium tetrakis(pentafluorophenyl)-borate salts (110 nmole). The candidate polymerization modifiers (PM) are tested at PM:Ti molar ratios of 5, 15, 50 and 200, polymerization temperatures of 120° C. and a pressure of 200 psi (1.4 MPa). The amount of styrene present in each reactor is 611 μL (533 μmol). Reagent details are contained in Table 2.

TABLE 2

| Reagent | Quantity | Concentration (Molar) |
|---|---|---|
| Toluene (solvent) | Variable depending on PM quantity | NA |
| Ethylene | 200 psig (1.4 MPa) | 0.48 M |
| cocatalyst 0.011 M in toluene | 100 µL (110 nanomol) | $1.71 \times 10^{-5}$ M |
| Polymerization Modifier (PM), 0.050 M in toluene/hexane | | |
| 5:1 | 10 µL (500 nanomol) | $7.75 \times 10^{-5}$ M |
| 15:1 | 30 µL (1,500 nanomol) | $23.2 \times 10^{-5}$ M |
| 50:1 | 100 µL (5,000 nanomol) | $77.5 \times 10^{-5}$ M |
| 200:1 | 400 µL (20,000 nanomol) | $310 \times 10^{-5}$ M |
| Styrene (comonomer) | 611 µL (533 µmol) | 0.827 M |
| catalyst, 0.010 M in toluene | 100 µL (100 nanomol) | $1.55 \times 10^{-5}$ M |
| | 6450 µL total volume | |

The empty mass of each 16 mL glass insert is measured robotically. Toluene (variable) is measured into each reactor cell. The reactors are then stirred (800 rpm) and heated to the run temperature, 120° C. At this time, all the reactors are saturated with ethylene and each individual reactor is charged with a premixture of cocatalyst and polymerization modifier, followed by styrene. The polymerization reaction is then initiated by the addition of catalyst while the temperature is maintained at 120° C. and the pressure is maintained at 200 psi (1.4 MPa). The reaction is allowed to proceed for 10 minutes with ethylene provided on demand. After the run time, the reactor is quenched with 5 percent $CO_2$ in argon. After all the reactors are quenched, they are cooled and vented. Volatiles are removed in a centrifuge under vacuum overnight.

Polymerization results are evaluated on the basis of three requirements 1) efficiency, 2) minimal high crystalline fraction formation, and 3) desirable profile of ethylene conversion as a function of PM/Ti ratio. Polymerization modifiers meeting one or more of the foregoing criteria are identified in Table 3. Efficiency is measured against a standard catalyst composition in which triisobutylaluminum modified methylalumoxane (MMAO-3A, available from Akzo-Noble Corporation) is used as the polymerization modifier (comparative). However, because of statistically suspect results for the minimum and maximum PM contents (Al/Ti ratios of 5 and 200 respectively) efficiencies are screened based only on results obtained at Al/Ti ratios of 15 and 50. Polymerization modifiers leading to equal or better efficiencies than the comparative are preferred for use herein. In Table 3, acceptable efficiency performances according to this standard are identified by numeral 1.

High crystalline fraction (HCF) refers to an ethylene/styrene interpolymer (ESI) having very low levels of styrene incorporation and correspondingly high crystallinity. It is also generally of lower solubility in a solution polymerization process and is implicated in poor reactor operability. The presence of such HCF polymer is identifiable from a GPC plot of the polymer. The use of higher polymerization temperatures can at least partially mitigate operability problems associated with the presence of significant quantities of HCF in the polymer, however, its presence is generally undesired due to its detrimental effect on product properties as well. Accordingly, a polymerization modifier that results in minimal HCF formation is desired. In Table 3, acceptable (non-detectable or minimal) HCF identified in the GPC plot of the ESI is indicated by numeral 2.

Ethylene polymerization profile refers to a lack of maximum ethylene conversion as a function of PM:Ti molar ratio, at least within ranges of PM:Ti that are economically justifiable. The presence of such a maximum, especially if use of additional polymerization modifier causes rapid loss of catalyst efficiency (peaking profile) requiring the operator to constantly adjust polymerization modifier content during polymerization to avoid detrimental effect on polymerization activity. An efficiency profile that increases through the range of interest or reaches a plateau without significant loss of activity at higher ratios is most desired. In Table 3 acceptable conversion performance (plateau or rising) is identified by a numeral 3 with rising profiles noted. Only those second components tested that have at least one acceptable PM are identified in Table 3.

TABLE 3

ESI Polymerization Results

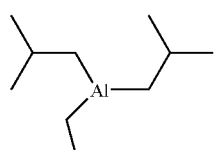
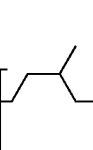

| | A1 | | A2 Al(Et)$_3$ | | A3 Al(Me)$_3$ | | A4 | | A5 | |
|---|---|---|---|---|---|---|---|---|---|---|
| | 1:1 | 2:1 | 1:1 | 2:1 | 1:1 | 2:1 | 1:1 | 2:1 | 1:1 | 2:1 |
| 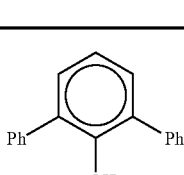 B1 | B1A1 | | B1A2 1, 2 | B1$_2$A2 1 | | | B1A4 1, 3 | B1$_2$A4 1 | B1A5 1, 3* | B1$_2$A5 1, 3* |

TABLE 3-continued

ESI Polymerization Results

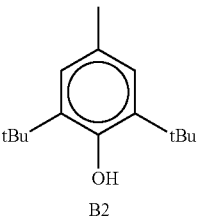

| | A1 | | Al(Et)₃ A2 | | Al(Me)₃ A3 | | A4 | | A5 | |
|---|---|---|---|---|---|---|---|---|---|---|
| | 1:1 | 2:1 | 1:1 | 2:1 | 1:1 | 2:1 | 1:1 | 2:1 | 1:1 | 2:1 |
| B2 | | | | | B2₂A3 1, 3 | | B2A4 1, 3. | | | |
| Ph₂NH, B3 | | B3₂A1 1, 3* | | B3₂A2 1, 2, 3 | | | B3A4 1, 2, 3* | | | |
| (Me₃Si)₂NH B9 | B9A1 1 | | | | | B9₂A3 1 | | B9₂A4 1 | B9A5 1,3* | |
| Ph-OH, B10 | | | | | | | | | B10A5 1, 3* | |
| t-Bu-OH, B11 | | | | | | | | | | |
| B12 | | | | | | | B12A4 1, 3 | | B12A5 1, 3* | |
| 1-dodecanol B13 | | | | | | | B13A4 1, 3 | | | |
| 1-octadecanol B14 | B14A1 1, 3* | | B14₂A 1, 3* | | | | B14A4 1 | B14₂A 1, 3* | B14A5 1, 3* | |

*also exhibits rising ethylene conversion as a function of Al/Ti ratio for entire range tested Polymerization modifiers meeting two and most preferably all three of the foregoing requirements for a given metal complex/cocatalyst combination are especially preferred. Only two polymerization modifiers, B3₃A2₂ and B3A4 (identified by bold type in table 3) of those tested satisfy all three requirements of the foregoing screen. These polymerization modifiers are identified as bis(N,N-diphenylamide)ethyl aluminum and N,N-diphenylamidobis(2,7-dimethyl-6-octene-1-yl)aluminum.

Example 2

2a) The polymerization conditions of example 1 are substantially repeated excepting 1-octene is employed in place of styrene and the polymerization is conducted at 135° C. in mixed alkanes solvent to prepare an elastomeric ethylene/1-octene copolymer. A new polymerization modifier library is prepared utilizing only three aluminum containing reagents, triisobutyl aluminum (A1) triethyl aluminum (A2) and trioctyl aluminum (A5).

Figure 2:
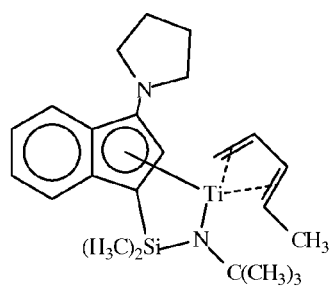
Figure 3:
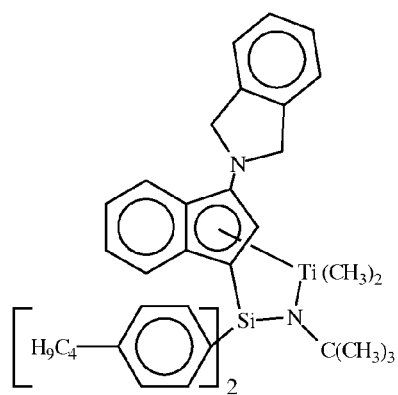

The catalyst precursors employed in the catalyst compositions are 3-amino-substituted inden-1-yl complexes of titanium, (N-1,1-dimethylethyl)-1,1-dimethyl-1-((1,2,3,3a,7a-η)-3-(tetrahydro-1H-pyrrol-1-yl)-1H-inden-1-yl)silanaminato-(2-)-N—)-titanium (II) 1,3-pentadiene (C2), prepared according to the teachings of U.S. Pat. No. 6,268,444, and (N-1,1-dimethylethyl)-1,1-(4-n-butylphenyl)-1-((1,2,3,3a,7a-η)-3-(1,3-dihydro-2H-isoindol-2-yl)-1H-inden-1-yl)silanaminato-(2-)-N—)-dimethyltitanium (C3), prepared according to the teachings of US 2003/0004286. The structures of C2 and C3 are disclosed in FIGS. 2 and 3. The cocatalyst is a mixture of methyldi($C_{14-18}$) long chain alkyl ammonium tetrakis(pentafluorophenyl)borate salts. In addition a scavenger, triisopropylaluminum modified methylalumoxane (MMAO 3A, available from Akzo-Noble Corporation) in a molar ratio based on Ti of 5:1 is employed in all formulations to react with impurities in the reaction mixture.

Range finding experiments are conducted to determine satisfactory quantities of the various components at each temperature tested. Conditions are selected so that activity could be measured without exceeding equipment capacity. At 135° C., the ethylene pressure is chosen to be 194 psig (1.44 MPa), the amount of hexane solvent is 6.0 μL, and the quantity of 1-octene employed is 819 μL. Additional representative conditions are provided in Table 4.

TABLE 4

| Catalyst (C2) | 85 μL | 17 nmol | Catalyst (C3) | 100 μL | 20 nmol |
| Cocatalyst | 85 μL | 20 nmol | Cocatalyst | 100 μL | 24 nmol |

TABLE 4-continued

| MMAO | 85 μL | 85 nmol | MMAO | 85 μL | 100 nmol |
| PM | 85 μL | 850 nmol | PM | 85 μL | 1000 nmol |

In each experiment, the reactor cells are loaded with solvent, followed by 1-octene, MMAO and PM (for control runs PM is omitted). The cells are then heated to 135° C. and pressurized with ethylene gas. The catalyst and cocatalyst are premixed in a vial by the liquid handler and injected into the reactor to start the polymerization. Polymerization is stopped after 10 minutes reaction time or upon a decrease in pressure to 120 psig (0.93 MPa) by quenching with carbon dioxide.

The PM choices are screened in duplicate within each PPR run. This allows for 22 candidate compounds per library along with four control reactions that use MMAO in an Al:Ti molar ratio 5:1 and no PM candidate. The PM:Ti molar ratio for all PM polymerizations is 50:1. Seven libraries for each catalyst are screened providing a total of 154 polymerization modifiers tested. Polymerization results are evaluated on the basis of activity compared to a standard catalyst composition in which no PM is present. The top 10 candidates for each catalyst and their relative catalyst activities are reported in Table 5.

TABLE 5

Ethylene/1-octene 135° C. Polymerization Results

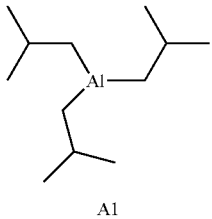
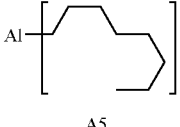
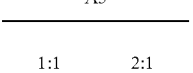

| | A1 | | Al(Et)$_3$ A2 | | A5 | |
|---|---|---|---|---|---|---|
| | 1:1 | 2:1 | 1:1 | 2:1 | 1:1 | 2:1 |
| 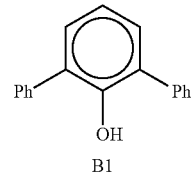 B1 | C2 (1.42) | | | | C1 (1.81) | C1 (1.81) C1 (1.81) |
| 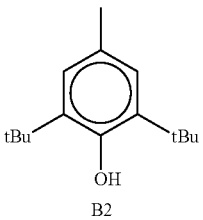 B2 | C2 (1.40) | | | | C1 (1.81) C2 (1.37) | C2 (1.42) |
| Ph-OH, B10 | C2 (1.84) | | | | C2 (1.74) | |
| t-Bu-OH, B11 | | | | | C2 (1.70) | |
| 1-dodecanol B13 | | | | | C2 (1.74) | |
| 1-octadecanol B14 | | | | | | |
| (t-Bu)(Me)$_2$SiOH B15 | C1 (1.75) C2 (1.44) | | | C1 (1.75) | C1 (1.35) | C1 (1.35) C2 (1.29) |
| HN(n-C$_5$H$_{11}$)$_2$ B16 | | | C1 (1.35) | | | |
| 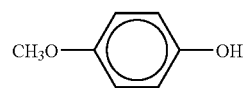 B17 | | | | | | C1 (1.60) |

At 135° C. with one or the other of the foregoing metal complexes the best polymerization modifiers are: the 1:1 molar reaction product of t-butanol with trioctylaluminum, that is, dioctylt-butoxyaluminum; the 1:1 molar reaction products of 2,6-diphenylphenol, 2,6-di(t-butyl)-4-methylphenol, phenol, and t-butyldi(methyl)hydroxysilane with triisobutylaluminum; the 2:1 molar reaction products of di(n-pentyl)amine with triisobutylaluminum; the 2:1 molar reaction product of 2,6-diphenylphenol, and t-butyldi(methyl)hydroxysilane with triethylaluminum; the 1:1 molar reaction products of 2,6-diphenylphenol, 2,6-di(t-butyl)-4-methylphenol, phenol, t-butanol, 1-dodecanol, t-butyldi(methyl)hydroxysilane, and p-methoxyphenol with trioctylaluminum; and the 2:1 molar reaction products of 2,6-diphenylphenol, 2,6-di(t-butyl)-4-methylphenol and t-butyldi(methyl)hydroxysilane with tri(octyl)aluminum. These reaction products comprise primarily the following compounds: (2,6-diphenylphenoxy)di(i-butyl)aluminum, (2,6-di(t-butyl)-4-methylphenoxy)di(i-butyl)aluminum, phenoxydi(i-butyl)aluminum, (t-butyldi(methyl)siloxy)di(i-butyl)aluminum, (di(n-pentyl)amino)di(i-butyl)aluminum, bis(di(2,6-phenyl)phenoxy)ethyl-aluminum, bis((t-butyl)dimethylsiloxy)ethylaluminum, (2,6-diphenylphenoxy)dioctylaluminum, (2,6-di(t-butyl)-4-methylphenoxy)dioctylaluminum, (phenoxy)dioctylaluminum, (t-butoxy)dioctyl aluminum, (n-dodecyloxy)dioctylaluminum, ((t-butyl)di(methyl)siloxy)dioctylaluminum, (4-methoxyphenoxy)dioctylaluminum, bis((2,6-diphenyl)phenoxy)octylaluminum, bis(2,6-di(t-butyl)-4-methylphenoxy)octylaluminum, and bis(t-butyldi(methyl)siloxy)octylaluminum. Three of the foregoing PM's gave improved activity with both metal complexes, namely, (t-butyldi(methyl)-siloxy)diisobutylaluminum, (2,6-di(t-butyl)-4-methylphenoxy)dioctylaluminum and bis(t-butyldi(methyl)siloxy)octylaluminum.

2b) Next, the 22 best PM candidates at 135° C. are retested for ethylene/1-octene copolymerization properties with both metal complexes at 160° C. In this series of experiments, the ethylene pressure is increased to 200 psig (1.48 MPa) and the quantity of 1-octene employed is 227 μL. Additional reagent amounts are listed in Table 6.

calculated 5 minute conversion, using the following polymerization model:

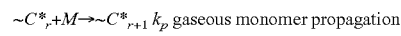

~$C^*_r$+M→~$C^*_{r+1}$ $k_p$ gaseous monomer propagation

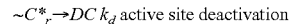

~$C^*_r$→DC $k_d$ active site deactivation where:
~$C^*_r$ is a growing chain with chain length r
M is the monomer
DC is dead polymer chain
$k_p$ is the gaseous monomer propagation rate constant, and
$k_d$ is the active site deactivation rate constant;
calculated as total gaseous monomer uptake versus time (t in seconds) according to the following equation:

$$\text{uptake} = \frac{k_p \cdot [M]_{liquid}[C]_0 [1 - \exp(-k_d \cdot t)]}{k_d} \quad \text{Eq 1}$$

as determined according to the Levenberg-Marquart non-linear regression method, where
$[M]_{liquid}$ is the gaseous monomer concentration in the liquid phase, and
$[C]_0$ is the initial concentration of the catalyst at t=0.

Eq 1 is then used to fit the conversion-time data obtained from each PPR cell. A Levenberg-Marquart non-linear regression method, substantially as described in W. H. Press, S. A. Teukolsky, W. T. Vetterling, B. P. Flannery, "Numerical Recipes in C", Second Edition, Cambridge University Press (1997), is used to fit Eq 1 into the data and to estimate the kinetic rate constants $k_p$ and $k_d$. Then, by substituting the estimated rate constants for each cell into Eq 1, ethylene conversion (pressure drop in kPa) after 5 minutes (t=300 sec) is calculated and used to rank the catalyst activity in each PPR cell. The top ten rankings for both catalysts at 160° C. are shown in Table 7. The results are expressed relative to the average 5 minute monomer uptake obtained using no PM candidate (MMAO alone) at an Al:Ti molar ratio of 5:1 for

TABLE 6

| Catalyst (C2) | 250 μL | 50 nmol | Catalyst (C3) | 300 μL | 60 nmol |
| Cocatalyst | 250 μL | 60 nmol | Cocatalyst | 300 μL | 72 nmol |
| MMAO | 250 μL | 250 nmol | MMAO | 300 μL | 300 nmol |
| PM | 250 μL | 2500 nmol | PM | 300 μL | 3000 nmol |

Conversion data collection is stopped after 10 minutes reaction or upon reaching a pressure drop to 120 psig (0.93 MPa). In order to better account for the results obtained where reactions are terminated before 10 minutes (because the target pressure is reached) the activity is evaluated based on the each metal complex. (The corresponding average 5 minute monomer uptakes using MMAO are C2=541 kPa, C3=472 kPa.). Superscripts 1-10 indicate ranking 1=best, 10=worst. All reported experiments had 5 minute monomer uptakes at least 42 percent greater than that obtained using MMAO alone (that is, relative activity=1.42).

TABLE 7

Ethylene/1-octene 160° C. Monomer Uptake Results (kPa)

|  | A1 (Al(i-Bu)$_3$) | | A2 (Al(Et)$_3$) | | A5 (Al(cyclohexyl)$_3$) | |
|---|---|---|---|---|---|---|
|  | 1:1 | 2:1 | 1:1 | 2:1 | 1:1 | 2:1 |
| B1 (2,6-diphenylphenol) |  | C3 (1.63$^7$) |  | C2 (1.44$^9$) | C2 (1.53$^7$)<br>C3 (1.70$^4$) | C3 (1.51$^8$) |
| B2 (2,6-di-t-butyl-4-methylphenol) | C2 (1.52$^8$)<br>C3 (1.47$^9$) |  |  |  | C2 (1.58$^6$) |  |
| Ph-OH, B10 |  |  |  |  | C2 (1.65$^4$)<br>C3 (1.69$^6$) |  |
| t-Bu-OH, B11 |  |  |  |  | C2 (1.70$^2$)<br>C3 (1.80$^2$) |  |
| B12 (pyrrolidine) |  |  |  |  |  |  |
| 1-dodecanol B13 |  |  |  |  | C2 (1.64$^5$)<br>C3 (1.80$^3$) |  |
| 1-octadecanol B14 |  |  |  |  |  |  |
| (t-Bu)(Me)$_2$SiOH B15 | C2 (1.82$^1$)<br>C3 (1.81$^1$) |  |  |  | C2 (1.42$^{10}$)<br>C3 (1.44$^{10}$) | C2 (1.68$^3$)<br>C3 (1.69$^5$) |

By comparison of Tables 5 and 7 it is seen that the only catalyst/polymerization modifier combinations demonstrating improvement in activity at 135° C. and improvement in calculated 5 minute activity at 160° C. for both metal complexes are the 1:1 molar reaction product of (t-butyl)dimethylhydroxylsilane with tri(i-butyl)aluminum, that is, (t-butyldimethylsiloxy)-di(isobutyl)aluminum and the 1:2 molar reaction product of (t-butyl)dimethylhydroxylsilane with trioctylaluminum, that is, bis(t-butyldimethylsiloxy)octylaluminum.

Example 3

Figure 4:
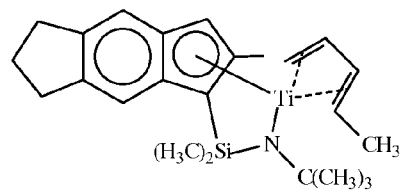

The reaction conditions of Example 2a) are substantially repeated excepting that the metal complex employed as a catalyst precursor is an s-indacenyl silanaminato complex of titanium, [N-(1,1-dimethylethyl)-1,1-dimethyl-[1,2,3,3a,8a-η)-1,5,6,7-tetrahydro-2-methyl-s-indacen-1-yl]silanaminto (2-)-N]titanium (II) 1,3-pentadiene (C4) (prepared according to the teachings of U.S. Pat. No. 5,965,756). The structure of C4 is disclosed in FIG. 4. The cocatalyst is a mixture of methyldi(C$_{14-18}$) long chain alkyl ammonium tetrakis(pentafluoro-phenyl)borate salts employed in a molar ratio based on the catalyst precursor of 1.2:1. Triisobutyl-aluminum modified methylalumoxane (MMAO-3A available from Akzo-Noble Corporation) (MMAO) is added as a scavenger in a molar ratio based on titanium of 5:1. The polymerization temperature is 135° C. All polymerizations are conducted in a mixed alkanes solvent (Isopar™ E, available from Exxon-Mobil Chemicals, Inc.) at PM:Ti molar ratios of 50:1, 25:1 and 10:1. The initial ethylene pressure is 200 psig (1.48 MPa) and the quantity of 1-octene employed is 227 μL. Controls are conducted in the absence of a PM candidate, all other reaction conditions remaining the same. PM candidates demonstrating relative ethylene uptakes greater than 1.00 after 10 minutes polymerization and the PM:Ti molar ratio (in parentheses) are contained in Table 8. All PM candidates listed are the 1:1 molar reaction products of the identified reactants. Those compounds demonstrating improved activity are the reaction products of phenylnaphthylamine, triethylhydroxysilane, n-butanol, or benzoic acid with triisobutylaluminum; the reaction products of 2,6-diphenylphenol, 4-methyl-2,6-di(t-butyl)phenol, triethylhydroxysilane, n-butanol or 2-hydroxymethylfuran with trioctylaluminum; and the reaction products of phenol or 2-(hydroxymethyl)pyridine with dibutylmagnesium. These metal containing compounds are identified as: (phenyl(naphthyl)amino)diisobutylaluminum, (triethylsiloxy)diisobutylaluminum, (n-butoxy)diisobutylaluminum, diisobutylaluminum benzoate; 2,6-diphenylphenoxy(dioctyl)aluminum, 4-methyl-2,6-dit-butylphenoxy)dioctylaluminum, (triethylsiloxy)dioctylaluminum, (n-butoxy)dioctylaluminum, (2-furanylmethoxy)dioctylaluminum; phenoxy-n-butylmagnesium, and (2-pyridinylmethoxy)-n-butylmagnesium.

In addition, by using the foregoing multiple reactor an aluminum compound lacking in Lewis base functionality was discovered to possess relatively good activity under the present reaction conditions. The compound, di-1-butylaluminum hydride, possessed a relative activity of 1.62 at a molar ratio based on Ti of 10:1.

The resulting LLDPE polymers are all higher density products than the products prepared in Example 2, and are suitable for use as film forming or blow molding resins.

TABLE 8

Ethylene/1-octene Copolymerization Relative Ethylene Uptake

|  | A1 | A5 | $(n-C_4H_9)_2Mg$ A6 |
|---|---|---|---|
| 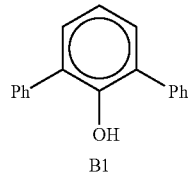 B1 | — | 1.93 (50)<br>1.92 (25)<br>1.92 (10) | — |
| 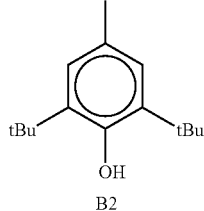 B2 | — | 1.92 (50)<br>1.93 (10)<br>1.92 (25) | — |
| Ph-OH B10 | — | — | 1.63 (10) |
| 1-dodecanol B13 | — | — | — |
| (t-Bu)(Me)$_2$SiOH B15 | — | — | — |
| 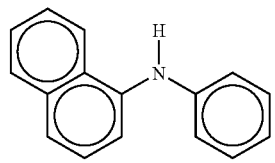 B24 | 1.92 (50)<br>1.92 (10) | — | — |
| 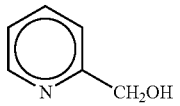 B25 | — | — | 1.11 (10) |
| $(C_2H_5)_3$SiOH B26 | 1.97 (50)<br>1.55 (25)<br>1.55 (10) | 1.50 (50)<br>2.02 (25)<br>1.38 (10) |  |
| n-C$_4$H$_9$OH B27 | 1.57 (50) | 1.02 (50)<br>1.82 (25) | — |

TABLE 8-continued

Ethylene/1-octene Copolymerization Relative Ethylene Uptake

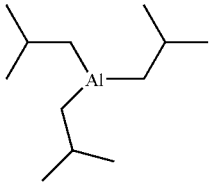

| | A1 | A5 | (n-C$_4$H$_9$)$_2$Mg A6 |
|---|---|---|---|
| 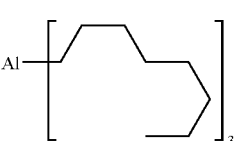<br>B28 | — | 1.84 (50)<br>1.72 (25) | — |
| 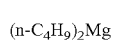<br>B29 | 1.11 (50)<br>1.59 (25)<br>1.09 (10) | — | — |

Example 4

Figure 5:
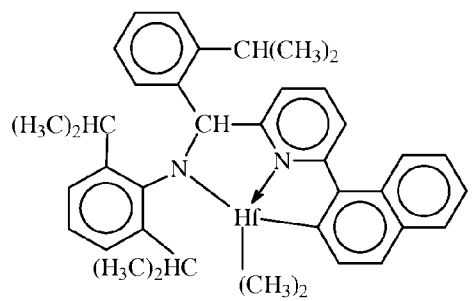

The combinatorial reactors of Example 1 are employed to copolymerize ethylene and propylene (50:50 by weight) using a variety of polymerization modifiers. The metal complex employed as a catalyst precursor is 2-[N-(2,6-diisopropylphenylamido)-o-isopropylphenylmethyl]-6-(2-η-1-naphthyl)-pyridyl hafnium(IV) dimethyl (C5) (prepared according to the teachings of U.S. Ser. No. 60/429,024, filed May 2, 2003). The structure of C5 is disclosed in FIG. 5. The cocatalyst used is a mixture of methyldi(C$_{14-18}$) long chain alkyl ammonium tetrakis(pentafluorophenyl)borate salts employed in a molar ratio based on hafnium of 1.2:1. Triisopropylaluminum modified methylalumoxane (MMAO-IP, available from Akzo-Noble Corporation) is added as a scavenger in a molar ratio based on hafnium of 30:1. Mixed alkanes solvent and scavenger followed by polymerization modifier (50:1, based on moles of hafnium) and cocatalyst are added to each cell. The quantity of solvent employed (approximately 2 ml) is precalculated to provide a final reaction mixture volume of 6.0 ml. The reactor is heated to the reaction temperature of 120° C. with stirring and pressurized (250 psig, 1.83 MPa) with the ethylene/propylene mixture before addition of the metal complex.

Polymerizations are conducted for 10 minutes or until a decrease of pressure equal to maximum conversion of 120 percent. A total of 162 polymerization modifiers are screened based on relative monomer uptake compared to use of MMAO-IP alone (molar ratio to Hf=30:1). Selected results are presented in Table 9. Only 4 PM candidates (indicated in bold type) demonstrate relative monomer uptakes greater than 1. Only three PM candidates showed at least 10 percent improvement (relative monomer uptake >1.1).

TABLE 9

Ethylene/Propylene Copolymerization Relative Monomer Uptake

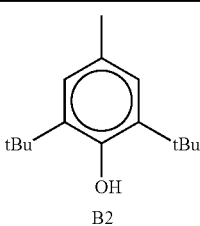

| | A1 | | Al(Et)$_3$<br>A2 | | A5 | |
|---|---|---|---|---|---|---|
| | 1:1 | 2:1 | 1:1 | 2:1 | 1:1 | 2:1 |
| B2 | 0.63 | 0.82 | 0.22 | 0.16 | 1.07 | 0.90 |

TABLE 9-continued

Ethylene/Propylene Copolymerization Relative Monomer Uptake

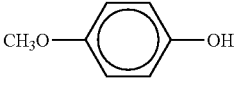

| | A1 | | A2 Al(Et)$_3$ | | A5 | |
|---|---|---|---|---|---|---|
| | 1:1 | 2:1 | 1:1 | 2:1 | 1:1 | 2:1 |
| (Me$_3$Si)$_2$NH B9 | 0.98 | 0.86 | 0.78 | 0.65 | 1.15 | 0.42 |
| Ph-OH, B10 | 0.99 | 0.10 | 0.09 | 0.04 | 1.13 | 0.09 |
| 1-dodecanol B13 | 0.08 | 0.07 | 0.06 | 0.07 | 1.17 | 0.08 |
| (t-Bu)(Me)$_2$SiOH B15 | 0.95 | 0.96 | 0.98 | 0.84 | 1.00 | 0.91 |
| B17 | 0.09 | 0.09 | 0.05 | 0.03 | 0.98 | 0.05 |

By comparison of the results of Tables 8 and 9, it may be seen that polymerization modifiers having suitable properties for some polymerizations, such as ethylene/1-octene copolymerizations are not necessarily suited for use as polymerization modifiers in other reactions, such as ethylene/propylene copolymerizations. Under combinatorial screening conditions, only the 1:1 reaction products of trioctylaluminum with 1-dodecanol, bis(trimethylsilyl)amine, phenol, and 4-methyl-2,6-di(t-butyl)phenol showed improved ethylene relative incorporation rates with the hafnium pyridyl amine metal complex, specifically 2-[N-(2,6-diisopropylphenylamido)-o-isopropylphenylmethyl]-6-(2-η-1-naphthyl)-pyridyl hafnium(IV) dimethyl and ammonium borate activator, specifically a mixture of methyldi(C$_{14-18}$) long chain alkyl ammonium tetrakis(pentafluorophenyl)borate salts with an alumoxane scavenger, specifically tri(isopropyl)aluminum modified methylalumoxane. These polymerization modifiers are identified as (dodecyloxy)dioctylaluminum, (bis(trimethylsilyl)-amino)dioctylaluminum, phenoxydioctylaluminum, and (4-methyl-2,6-di-t-butylphenoxy)dioctyl-aluminum.

When the polymerization conditions of Example 4 are scaled up to a one liter batch reactor under equivalent polymerization conditions, the foregoing PM candidates show superior performance under actual use conditions, illustrating the reliability of the foregoing screening technique for predicting successful polymerization modifier performance. Other suitable polymerization modifiers under larger scale batch polymerization conditions include (t-butyldimethylsiloxy)dioctylaluminum having a relative activity of 1.0 under combinatorial conditions (B15A5 in Table 9), (bis(trimethylsilyl)amino)diethylaluminum, having a relative activity under combinatorial conditions of 0.78 (B9A2 in Table 9), and bis(t-butyldimethylsiloxy)isopropylaluminum, having a relative activity under combinatorial conditions of 0.96 (B15$_2$A1 in Table 9).

The invention claimed is:

1. A composition comprising a polymerization modifier for the copolymerization of at least one olefin monomer and styrene, wherein the modifier is selected from the group consisting of bis(N,N-diphenylamide)ethyl aluminum and N,N-diphenylamidobis(2,7-dimethyl-6-octene-1-yl)aluminum.

2. The composition of claim 1 further comprising a transition metal complex and a cocatalyst.

3. The composition of claim 2 wherein the metal complex is a Group 4 metal complex and the cocatalyst is a Lewis acid or a trihydrocarbylammonium salt of a noncoordinating compatible anion.

4. The composition of claim 3 wherein the metal complex comprises (1H-cyclopenta[l]phenanthrene-2-yl)dimethyl(t-butylamido)silanetitanium dimethyl; and,
the cocatalyst comprises tris(pentafluorophenyl)boron or a trialkylammonium salt of tetrakis(pentafluorophenyl) borate.

5. A polymerization process comprising contacting at least one olefin monomer and styrene under polymerization conditions with the composition of claim 2.

6. The polymerization process of claim 5 wherein the metal complex is a Group 4 metal complex and the cocatalyst is a Lewis acid or a trihydrocarbylammonium salt of a noncoordinating compatible anion.

7. The polymerization process of claim 5 wherein the metal complex comprises (1H-cyclopenta[l]phenanthrene-2-yl) dimethyl(t-butylamido)silanetitanium dimethyl; and,
the cocatalyst comprises tris(pentafluorophenyl)boron or a trialkylammonium salt of tetrakis(pentafluorophenyl) borate.

* * * * *